(12) United States Patent
Czompo

(10) Patent No.: US 8,781,737 B2
(45) Date of Patent: Jul. 15, 2014

(54) SPATIAL ALIGNMENT DETERMINATION FOR AN INERTIAL MEASUREMENT UNIT (IMU)

(75) Inventor: Joseph Czompo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1272 days.

(21) Appl. No.: 12/622,703

(22) Filed: Nov. 20, 2009

(65) Prior Publication Data

US 2011/0125404 A1  May 26, 2011

(51) Int. Cl.
*G01C 21/10* (2006.01)
(52) U.S. Cl.
USPC ........... 701/500; 701/469; 701/505; 701/468; 73/178 R; 342/357.47
(58) Field of Classification Search
USPC .................. 701/500, 220, 469, 472; 702/152; 345/659; 73/178 R
See application file for complete search history.

(56) References Cited

U.S. PATENT DOCUMENTS

| | | | |
|---|---|---|---|
| 5,991,692 A | 11/1999 | Spencer, II et al. | |
| 6,311,129 B1 | 10/2001 | Lin | |
| 7,337,650 B1 | 3/2008 | Preston et al. | |
| 8,265,826 B2 * | 9/2012 | Feller et al. | 701/41 |
| 8,311,757 B2 * | 11/2012 | Lin | 702/92 |
| 8,494,225 B2 * | 7/2013 | Center | 382/107 |
| 2001/0020216 A1 | 9/2001 | Lin | |
| 2002/0165669 A1 * | 11/2002 | Pinto et al. | 701/213 |
| 2007/0032950 A1 | 2/2007 | OFlanagan et al. | |
| 2008/0077326 A1 * | 3/2008 | Funk et al. | 701/220 |
| 2009/0070058 A1 * | 3/2009 | Lin | 702/93 |
| 2009/0124204 A1 * | 5/2009 | Howard et al. | 455/59 |
| 2009/0254279 A1 | 10/2009 | Han et al. | |
| 2011/0125404 A1 * | 5/2011 | Czompo | 701/216 |
| 2012/0022780 A1 * | 1/2012 | Kulik et al. | 701/220 |

FOREIGN PATENT DOCUMENTS

| | | |
|---|---|---|
| EP | 1983304 A2 | 10/2008 |
| WO | 2005024457 A1 | 3/2005 |

OTHER PUBLICATIONS

Vision—IMU Integration Using a Slow-Frame-Rate Monocular Vision System in an Actual Roadway Setting; Randeniya, D.I.B. ; Sarkar, S. ; Gunaratne, M.;Intelligent Transportation Systems, IEEE Transactions on; vol. 11 , Issue: 2; Digital Object Identifier: 10.1109/TITS.2009.2038276; Publication Year: 2010 , pp. 256-266.*
Buried object scanning sonar for AUVs; Schock, S.G. ; Wulf, J.;OCEANS 2003. Proceedings; vol. 1; Digital Object Identifier: 10.1109/OCEANS.2003.178629; Publication Year: 2003 , pp. 494-499 vol. 1.*

(Continued)

*Primary Examiner* — Cuong H Nguyen
(74) *Attorney, Agent, or Firm* — Shyam K. Parekh; Michael Johnson

(57) ABSTRACT

The subject matter disclosed herein relates to a system and method for determining a spatial alignment of an inertial measurement unit (IMU). By way of example, a method is described in which a first vehicle-based direction is identified, and the first vehicle-based direction is associated with a first direction that is transformable to an earth-based coordinate frame. A spatial alignment of the IMU is determined based at least partially on the first direction.

60 Claims, 10 Drawing Sheets

(56) References Cited

OTHER PUBLICATIONS

Precise heading and DGPS measurements of vessel motion improve VM-ADCP current measurements significantly; Godhavn, J. ; Jaccard, P.;OCEANS '99 MTS/IEEE. Riding the Crest into the 21st Century; vol. 3;Digital Object Identifier: 10.1109/OCEANS.1999.800204;Publication Year: 1999 , pp. 1435-1440 vol. 3.*

Kinematic positioning in three dimensions using CCD technology; El-Sheimy, N. ; Schwarz, K.P.;Vehicle Navigation and Information Systems Conference, 1993., Proceedings of the IEEE-IEE; Digital Object Identifier: 10.1109/VNIS.1993.585675 Publication Year: 1993 , pp. 472-475.*

Inertial navigation aided with GPS information; Nebot, E. ; Sukkarieh, S. ; Durrant-Whyte, H.; Mechatronics and Machine Vision in Practice, 1997. Proceedings., Fourth Annual Conference on; Digital Object Identifier: 10.1109/MMVIP.1997.625317 Publication Year: 1997 , pp. 169-174.*

Impact of carrier to noise power density, platform dynamics, and IMU quality on deeply integrated navigation; Lashley, M. ; Bevly, D.M. ; Hung, J.Y.;Position, Location and Navigation Symposium, 2008 IEEE/ION; Digital Object Identifier: 10.1109/PLANS.2008.4569964; Publication Year: 2008 , pp. 9-16.*

Observability of an integrated GPS/INS during maneuvers; Rhee, I. ; Abdel-Hafez, M.F. ; Speyer, J.L.; Aerospace and Electronic Systems, IEEE Transactions on; vol. 40 , Issue: 2; Digital Object Identifier: 10.1109/TAES.2004.1310002 Publication Year: 2004 , pp. 526-535.*

Changshanzhao et al: "On-the-move alignment for strap-down inertial navigation system", Information and Automation, 2008. ICIA 2008. International Conference on, IEEE, Piscataway, NJ, USA, Jun. 20, 2008, pp. 1428-1432, XP031313416, ISBN: 978-1-4244-2183-1 p. 1428-p. 1429 p. 1431.

International Search Report and Written Opinion—PCT/US2010/057499—ISA/EPO—Aug. 8, 2011.

Taiwan Search Report—TW099140046—TIPO—Aug. 12, 2013.

\* cited by examiner $R^{ECEF}_{ENU}$ $R^{ENU}_{RCU}$

SPATIAL ALIGNMENT DETERMINATION FOR AN INERTIAL MEASUREMENT UNIT (IMU)

BACKGROUND

1. Field

The subject matter disclosed herein relates to determining a spatial alignment of an inertial measurement unit (IMU).

2. Information

Navigational aids have long been important for commerce and travel. For hundreds or thousands of years, travelers had to rely on paper maps or the verbal directions of a friendly stranger to find their way to a given destination. In contrast, electronic navigational aids have been developed over the last few decades. Because of their original size, expense, and complexity, they were initially used primarily by the military, other governmental entities, and large common carriers, such as ocean liners and airplanes. Recently, however, some electronic navigational aids have become smaller, cheaper, and simpler to use. They have therefore become available to a wider array of people.

In comparison to traditional navigational aids, electronic navigational aids may more easily keep their navigational information current, may offer a greater wealth of navigational information, may offer additional features that were previously not possible, and so forth. For example, modern navigational aids may be capable of offering any of many navigational-related features that may include, but are not limited to: providing general directions, plotting courses between origins and destinations, displaying maps, presenting so-called turn-by-turn directions, recording a path that has been traveled, combinations thereof, and so forth.

An example type of electronic navigational aid uses a satellite positioning system (SPS) in conjunction with an inertial navigation system (INS). This type of electronic navigational aid, which is at times referred to as an SPS-INS navigational system, uses an IMU. To operate such an SPS-INS navigational system, the spatial alignment of the IMU is determined to some level of precision with respect to an earth centered earth fixed (ECEF) coordinate frame.

As indicated above, some navigational aids are implemented in relatively small packages, including some devices that are capable of being carried by an individual. Such portable devices can also be made sufficiently inexpensive so as to be considered affordable by many people. Unfortunately, the size and cost reductions that have been implemented for devices having navigational-aid-related features can produce negative results. More specifically, such devices may be generally less capable of determining a sufficiently accurate spatial alignment of an IMU. Consequently, in certain situations it can be difficult, onerous, or even impossible to use such devices with an SPS-INS navigational system.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
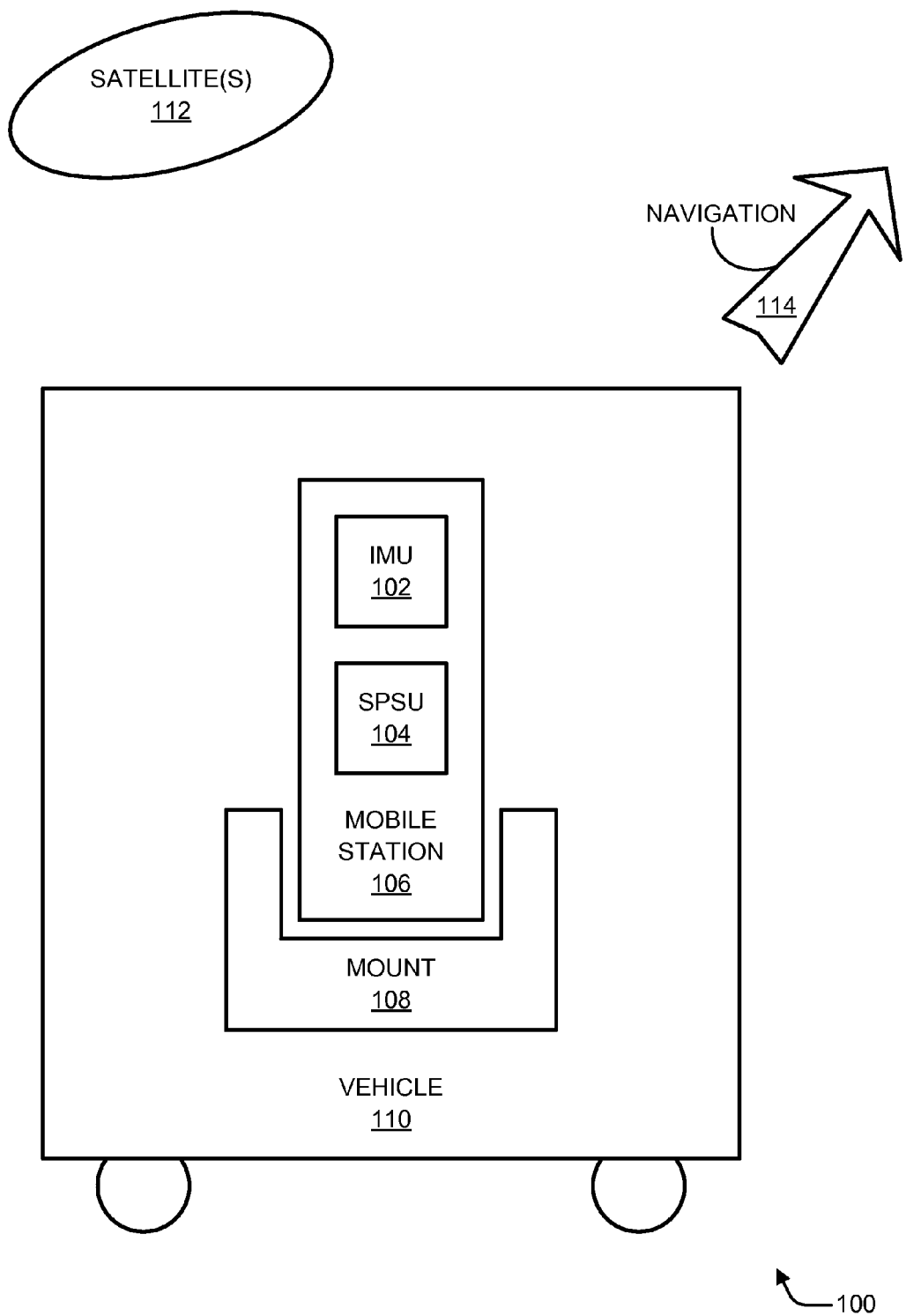
FIG. 1 is a block diagram of an example environment in which an SPS-INS navigational system may be implemented with an inertial measurement unit (IMU) and an SPS unit (SPSU) according to an implementation.

In an example implementation, a method is provided in which a first vehicle-based direction is identified and the first vehicle-based direction is associated with a first direction that is transformable to an earth-based coordinate frame. A spatial alignment of an IMU is determined based at least partially on the first direction. It should be appreciated, however, that this is merely an example implementation and that other implementations are described herein and may be employed without deviating from claimed subject matter.

DETAILED DESCRIPTION

Reference throughout this Specification to "one example," "one feature," "an example," "one feature," and so forth means that a particular feature, structure, characteristic, etc. described in connection with the feature and/or example is relevant to at least one feature and/or example of claimed subject matter. Thus, the appearances of a phrase such as "in one example," "an example," "in one feature," "a feature," and so forth in various places throughout this Specification are not necessarily all referring to the same feature and/or example. Furthermore, the particular features, structures, characteristics, etc. may be combined in one or more examples and/or features.

As indicated above, the spatial alignment of an IMU may be determined with respect to an ECEF coordinate frame to facilitate combined INS-SPS navigation in an SPS-INS navigational system. The spatial alignment of the IMU may be determined with two vectors that are related to gravity and to the earth's rotation. The former may be detectable with accelerometer(s), and the latter may be detectable with relatively high-quality gyroscope(s). However, one of the technologies currently used that enables navigational aids to be more compact and less expensive relates to micro electro-mechanical systems (MEMS) sensors. Unfortunately, the inherent noise in such MEMS sensors overwhelms the finer measurements of the earth's rotation. Consequently, the earth's rotation may not be detectable with current MEMS sensors.

As another possible approach to determining the spatial alignment of an IMU, an IMU sensor frame can be physically aligned with the physical structure of a vehicle to which it is coupled. This enables a correspondence to be drawn between the forward acceleration detected by the IMU sensor frame and forward velocity information (e.g., that may be based on velocity data that is provided via another navigational apparatus and/or system, such as an SPS). Unfortunately, this may entail affixing the device housing the IMU to the vehicle in a particular, predetermined position. Although this might be an acceptable approach for navigational aids that are integrated with a vehicle, it is much less acceptable, if it is at all feasible, for portable devices that offer navigational aid feature(s). It is especially unacceptable for a mobile station that includes many other features (e.g., such as communication) in addition to navigation because a user is likely to constantly remove it from the vehicle upon their exit.

However, experimentation has revealed that an approximate alignment is usually sufficient to initiate an SPS-INS navigational system. After initiation, refined values for the alignment angles may be resolved during combined SPS-INS navigation using information from an SPS. Determination of an IMU's spatial alignment may be based on the principle that if vector quantities known in an ECEF coordinate frame can be measured by the IMU, these vector quantities can be used to derive the spatial relationship between the IMU and the ECEF frame.

For MEMS IMU systems, for example, this means that it may not be possible to perform a full alignment on a stationary system because during a stationary period the observable quantity is gravity. This leaves one degree of freedom undetermined On the other hand, gravity that is measured on a moving platform has a degraded accuracy due to the incidental accelerations of the host platform. This creates an inherent contradiction that may be resolved by measuring gravity while the system is stationary and then determining the spatial alignment of the IMU to a non-zero SPS velocity. Disadvantages of this approach are twofold: first, the gravity direction and the SPS velocity direction do not exactly correspond to the same alignment because they are separated by time and space; secondly, a selected axis of the IMU is still physically aligned in a known way with the SPS velocity direction in order for this approach to work.

For certain example implementations, on the other hand, there need be no assumption of either a stationary state at the beginning of a navigation session or any particular alignment of the IMU axes with respect to the vehicle or with respect to an ECEF frame. Instead, the physical alignment of the IMU and/or the physical alignment of a device housing the IMU may be maintained constant with respect to the vehicle while vehicle velocities are being measured (e.g., using a navigational-related apparatus and/or system, such as an SPS). Certain example implementations are based on measuring vectors in an IMU coordinate system that are known in, or at least transformable into, an earth-based coordinate system. For example, vehicle related movement data may be correlated with one or more measured accelerations to identify one or more vehicle-based directions. Such vehicle-based directions may be associated with directions that are transformable to an earth-based coordinate frame.

FIG. 1 is a block diagram of an example environment 100 in which an SPS-INS navigational system may be implemented with an IMU 102 and an SPSU 104 according to an implementation. As illustrated, example environment 100 includes IMU 102, SPSU 104, a mobile station 106, a mount 108, a vehicle 110, satellites 112, and a navigation icon 114. In an example, mobile station 106 may include IMU 102 and SPSU 104. Mobile station 106 may be removably secured to mount 108. Mount 108 may be fixedly secured to vehicle 110. Vehicle 110 is capable of moving around, on, over, etc. the earth as indicated by navigation icon 114. Navigation may be facilitated by an SPS involving one or more satellites 112 in conjunction with at least SPSU 104.

Mobile station 106 may alternatively be (removably or permanently) coupled to IMU 102 and/or SPSU 104 (e.g., as separate module(s) that are physically attached or coupled wirelessly). Mobile station 106 may comprise any portable device that includes a navigational-aid-related feature. Mobile station 106 may be realized as a smart phone, a mobile phone, a mobile terminal, a personal digital assistant (PDA), a personal information manager (PIM), a personal navigation device (PND), a so-called netbook, a laptop or notebook computer, an entertainment appliance (e.g., a media player, a gaming machine, etc.), a dedicated navigational device, some combination thereof, and so forth, just to name a few examples. A generic device, which includes an IMU 102 and an SPSU 104, that may be capable of receiving wireless communications and/or navigation signals and offering navigational features is described herein below with particular reference to FIG. 12.

In an example implementation, mount 108 may be fixedly (but either permanently or removably) attached to vehicle 110. Mount 108 may be adapted to receive and secure mobile station 106 thereto. Hence, mobile station 106 is secured in a fixed relationship with vehicle 110 via mount 108. This arrangement enables mobile station 106 to be conveniently taken with a user when they exit vehicle 110 while still keeping mobile station 106 fixed relative to vehicle 110 while it is in motion. Alternatively, mobile station 106 may be maintained in a constant physical alignment with respect to vehicle 110 without using mount 108 (e.g., by using some other mechanism that directly couples mobile station 106 to vehicle 110, by manually holding it in place, etc.).

Example implementations that are described herein may be used with various SPSs. Examples include, but are not limited to, the United States Global Positioning System (GPS), the Russian Glonass system, the European Galileo system, any system that uses satellites from a combination of satellite systems, any satellite system developed in the future, and so forth. Furthermore, implementations described herein may be used with positioning determination systems that utilize pseudolites or a combination of satellites and pseudolites. Pseudolites are usually ground-based transmitters that broadcast a Pseudo-Random Noise (PRN) code or other ranging code (e.g., similar to a GPS or CDMA cellular signal) that is modulated on an L-band (or other frequency) carrier signal, which may be synchronized with GPS time. Each such transmitter may be assigned a unique PN code so as to permit identification by a remote receiver. Pseudolites are particularly useful in situations where GPS signals from an orbiting satellite might be unavailable, such as in tunnels, mines, buildings, urban canyons, or other enclosed areas. Another implementation of pseudolites is known as radio-beacons. The term "satellite", as used herein, is intended to include pseudolites, equivalents of pseudolites, and similar and/or analogous technologies. The term "SPS signals", as used herein, is intended to include SPS-like signals from pseudolites or equivalents of pseudolites.

Figure 2:
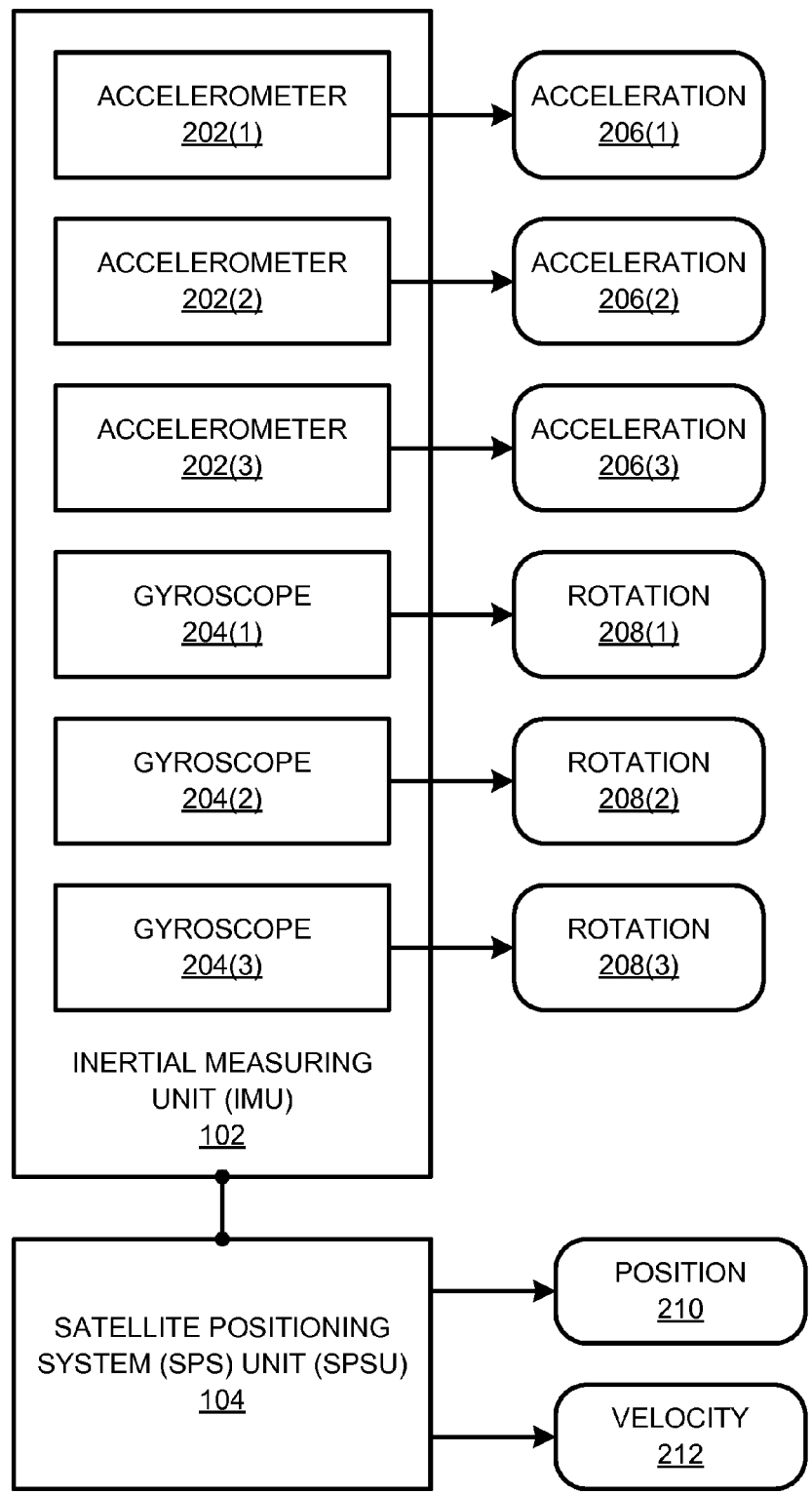
FIG. 2 depicts a block diagram including an example IMU and an example SPSU according to an implementation.

FIG. 2 depicts a block diagram 200 including an example IMU 102 and an example SPSU 104 according to an implementation. In an example, IMU 102 may include at least one accelerometer 202 and at least one gyroscope 204. As illustrated, IMU 102 includes three accelerometers 202(1), 202 (2), and 202(3) and three gyroscopes 204(1), 204(2), and 204(3). However, a given IMU 102 may include more or fewer accelerometers 202 and/or gyroscopes 204.

As shown, each accelerometer 202(1), 202(2), and 202(3) measures and provides a respective acceleration 206(1), 206 (2), and 206(3). Similarly, each gyroscope 204(1), 204(2), and 204(3) measures and provides a respective rotation 208 (1), 208(2), and 208(3). Also, via signals received from and/or exchanged with a satellite system, SPSU 104 may provide SPS data. For example, SPSU 104 may be capable of providing position data 210 and/or velocity data 212. If a position 210 is provided (but not a velocity 212), changes in position 210 over time may be used to compute a velocity 212 that is derived from or otherwise based on the SPS positional data.

Generally, sensors (e.g., accelerometers 202, gyroscopes 204, etc.) may be contained within a portable device itself or may instead be in communication with such a portable device. For example, such sensors may be contained within a module that may be coupled to a portable electronic device to measure movement. Such a module may comprise, for example, another electronic device that may be removably coupled to the portable electronic device.

An accelerometer may be used to sense the direction of gravity or any other, e.g., linear force experienced by the accelerometer. A gyroscope may be utilized to measure rotational information, including heading changes. A gyroscope may detect rotations due, for example, to driving on a winding road or an uneven road.

If a particular implementation employs both accelerometers and gyroscopes ("gyros"), six dimensions of observability (x, y, z, ω, φ, ψ) may be provided. An accelerometer may sense linear motion (e.g., translation in a plane, such as a horizontal plane). Translation can be measured with reference to at least two dimensions. Such an accelerometer can also offer a measure of an object's tilt (roll or pitch). Thus, with a single 3D accelerometer, an object's motion in Cartesian coordinate space (x, y, z) can be sensed, and the direction of gravity can be sensed to estimate the object's roll (ω) and pitch (φ). Because accelerometers may not be able to easily differentiate between the object's linear motion and tilt, a gyroscope may be used to measure the rotation about (x, y, z) coordinates, that is, roll (ω) and/or pitch (φ) and/or yaw (ψ), which is sometimes referred to as azimuth or heading. Linear and angular accelerometers, gyroscopes, etc. may be integrated into a portable electronic device to provide adequate degrees of observability.

Some accelerometers may provide a magnitude and/or direction while others may simply provide an indication of movement without a magnitude. An accelerometer may measure linear movement along a line with reference to one, two, or three linear directions, often referenced with Cartesian coordinates (x, y, z). For example, a one-dimensional accelerometer may provide measurements to indicate linear movement along an x-dimension. A two-dimensional accelerometer may provide measurements to indicate linear movement in a plane along both the x-dimension and a y-dimension, and a three-dimensional accelerometer may provide measurements to indicate linear movement in 3-dimensional space along x, y, and z-dimensions. By way of example only, a three-dimensional accelerometer may comprise a two-dimensional accelerometer combined with a one-dimensional accelerometer, or it may comprise three one-dimensional accelerometers.

Measured accelerations may be expressed in vector form (e.g., having and/or being associated with magnitudes and directions), or they may be expressed as scalar values, a series of scalar values, time varying functions, some combination thereof, and so forth. In general, an accelerometer may comprise a sensing means for detecting motion and generating information indicative of linear movement along the one, two, or three dimensions of such an accelerometer. Alternatively, a non-Cartesian coordinate system can be used. In particular implementations, a coordinate system may define dimensions that are mutually orthogonal. It should be noted that accelerometers that differ from the examples described above may alternatively be employed in described implementations without departing from claimed subject matter.

Gyroscopes may measure rotations and represent such rotational movement with scalar values, a series of scalar values, time varying functions, vectors, and so forth, just to name a few examples. Gyroscopes may measure rotational movement (e.g., a vector) about one, two, or three dimensions. In one particular implementation, gyroscopic rotation may be measured in terms of coordinates (ω, φ, ψ), where tau (ω) represents yaw or rotation about the z-dimension, phi (φ) represents roll or rotation about the x-dimension, and psi (ψ) represents pitch or rotation about the y-dimension. In an example implementation, a gyroscope may comprise a one-dimensional gyroscope to provide measurements indicating rotational movement about a first dimension. In another example implementation, a gyroscope may comprise a two-dimensional gyroscope to provide measurements indicating rotational movement about a first dimension and a second dimension. Likewise, in another example implementation, a gyroscope may comprise a three-dimensional gyroscope to provide measurements indicating rotational movement about first, second, and third dimensions.

Such a three-dimensional gyroscope may comprise, by way of example, a two-dimensional gyroscope combined with a one-dimensional gyroscope, or it may comprise three one-dimensional gyroscopes. Rotational motion may be represented by three scalar values, a series of scalar values, time varying functions in vector from, and so forth, just to name a few examples. In particular implementations, a gyroscope may comprise a sensing mechanism for detecting motion and producing information indicative of rotational (e.g., angular) movement about one, two, or three dimensions of the gyroscope. It should be noted that gyroscopes that differ from the examples described above may alternatively be employed in described implementations without departing from claimed subject matter.

A single (e.g., 1-D) accelerometer may measure acceleration, and a single (e.g., 1-D) gyroscope may measure rotational movement such as a tilt or roll, for example. Also, integrating two separate accelerometers, two separate gyroscopes, or a combination of an accelerometer and a gyroscope into a portable electronic device may be used to sense accelerations as well as angular movements. In another example, a three-dimensional accelerometer and a three-dimensional gyroscope (e.g., including three 1-D accelerometers and gyroscopes) provide six dimensions of observability (x, y, x, ω, φ, ψ). A reduced dimensional sensor may be used to sense fewer dimensions of acceleration and/or rotational motion. For example, a two-dimensional accelerometer and a two-dimensional gyroscope may provide four dimensions of observability (x, y, ω, φ). Certain example implementations that are described herein may implement at least one accelerometer 202 of one or more dimensions to obtain acceleration data 206 and at least one gyroscope 204 of one or more dimensions to obtain rotational data 208.

Different coordinate systems or frames are described with particular reference to FIGS. 3-6. As discussed above, directions that are measurable by an IMU may be transformed to an earth-based coordinate frame to determine a spatial alignment of the IMU with respect to the earth-based coordinate frame. One or more interim transformations may be employed to achieve the overall transformation. In certain example implementations, a conversion from an IMU coordinate frame to an earth-based coordinate frame is accomplished using a series (e.g., of three) rotations. Each of multiple coordinate systems may be transformed from one to another.

To convert from an IMU coordinate frame to an earth-based coordinate frame, a transformation matrix may be used, for example. Thus, a transformation matrix $R_{IMU}^{ECEF}$ may be determined, at least approximately, between the IMU coordinate frame and the ECEF frame. This rotation matrix may be constructed as a series of rotations, as shown below in Equation (1):

$$R_{IMU}^{ECEF} = R_{ENU}^{ECEF} R_{RCU}^{ENU} R_{IMU}^{RCU}. \tag{1}$$

The variable "RCU" represents right, course-over-ground, and up directions. The variable "ENU" represents east, north, and up directions. As used herein, "earth-based coordinate frame" may refer to an ECEF. "Cardinal-direction-based coordinate frame" may refer to a coordinate frame that utilizes cardinal directions, such as the ENU system for example. "Vehicle-based coordinate frame" may refer to a coordinate frame that utilizes directions in which a vehicle can typically have movements, such as the RCU system for example.

Thus, for example implementations that involve Equation (1), the transformation may proceed from IMU to RCU, from RCU to ENU, and from ENU to ECEF. The RCU coordinate system may be conveniently selected such that vectors known in RCU can be measured in the IMU frame. This facilitates their transformation into the ECEF frame because both $R_{ENU}^{ECEF}$ and $R_{RCU}^{ENU}$ may be accessible or obtainable using data from an SPS, for example.

Figure 3:
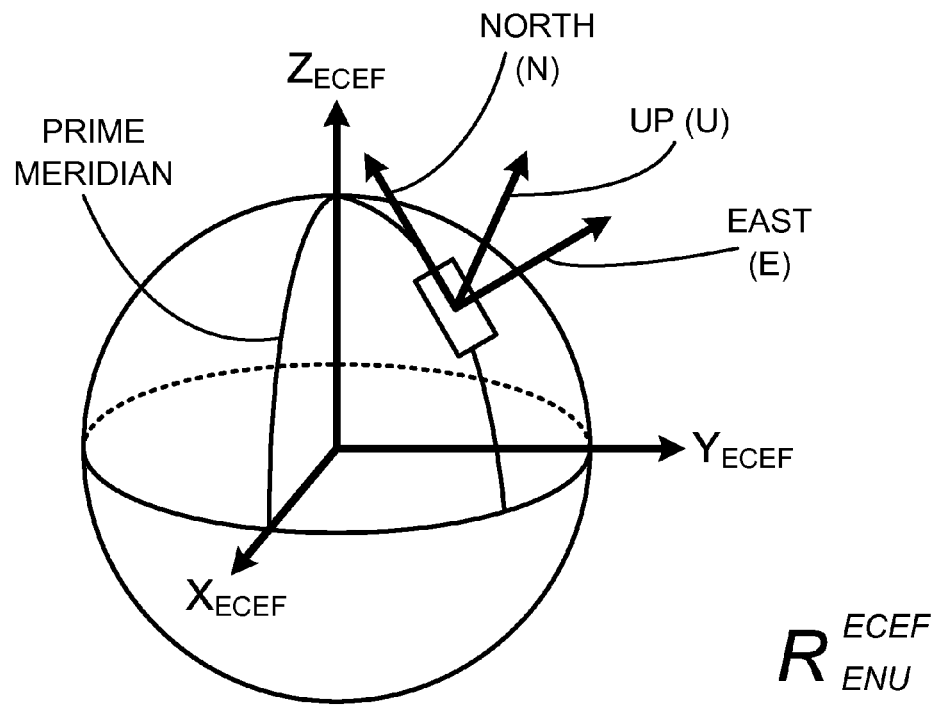
FIG. 3 graphically illustrates an example relationship between an ECEF coordinate frame and a cardinal-direction-based coordinate frame according to an implementation.

FIG. 3 graphically illustrates an example relationship 300 between an ECEF coordinate frame and a cardinal-direction-based coordinate frame according to an implementation. In other words, FIG. 3 may illustrate an example relationship between ECEF and ENU coordinate frames. Relationship 300 is illustrated to include a sphere that represents the earth. The earth is shown as having three axes $X_{ECEF}$, $Y_{ECEF}$, and $Z_{ECEF}$. The prime meridian is also pictured for reference. These axes may represent the ECEF.

The ENU, as an example cardinal-direction-based coordinate frame, also includes three axes. For example, these axes and directions may be: east (E), north (N), and up (U). It should be noted that FIG. 3 is slightly imprecise inasmuch as the ENU and ECEF frames are co-centric in the example mathematical implementations that are described herein below. In other words, there is no translation between the two frames; thus, transformations may be accomplished using rotations without translations. The rotation $R_{ENU}^{ECEF}$ may be dependent on the geodetic coordinates latitude φ and longitude λ, which may be available from, for example, an SPS solution as shown in Equation (2):

$$R_{ENU}^{ECEF} = \begin{bmatrix} -\sin\lambda & -\sin\varphi\cos\lambda & \cos\varphi\cos\lambda \\ \cos\lambda & -\sin\varphi\sin\lambda & \cos\varphi\sin\lambda \\ 0 & \cos\varphi & \sin\varphi \end{bmatrix}. \tag{2}$$

Figure 4:
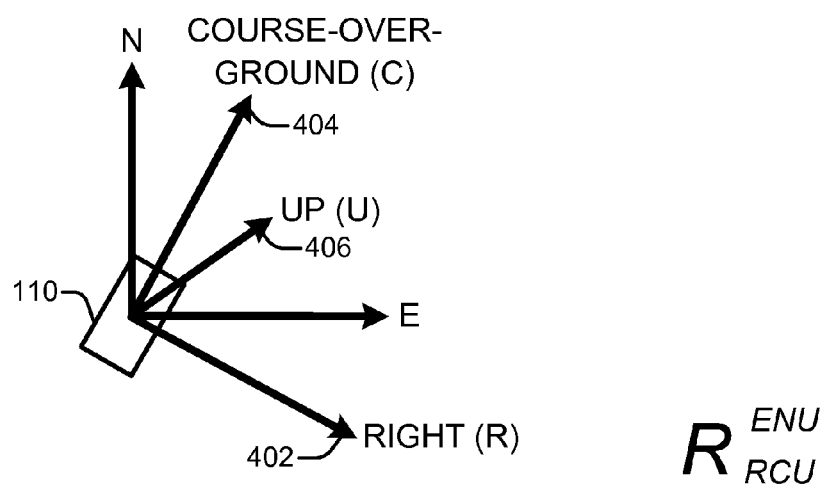
FIG. 4 graphically illustrates an example relationship between the cardinal-direction-based coordinate frame and a vehicle-based coordinate frame according to an implementation.

FIG. 4 graphically illustrates an example relationship 400 between a cardinal-direction-based coordinate frame and a vehicle-based coordinate frame according to an implementation. In other words, FIG. 4 may illustrate an example relationship between ENU and ECU coordinate frames. The ENU coordinate frame from relationship 300 (of FIG. 3) is also depicted as part of relationship 400. The RCU, as an example vehicle-direction-based coordinate frame, also includes three axes. For example, these three axes and directions may be: right (R) 402, course-over-ground (C) 404, and up (U) 406. These three RCU axes and directions may be defined with regard to vehicle 110.

The RCU coordinate system may be constructed from the ENU frame by rotating the ENU frame around the up (U) axis 406 such that the north (N) axis points to the direction of the horizontal component of the SPS velocity (e.g., the course-over-ground (C) direction 404). This facilitates coordinate system conversion because the SPS velocity component points approximately in the direction of the vehicle's forward axis. Multiple example implementations that are described herein refer to SPS-derived data, SPS-related positional data, and/or SPS-related velocity data. It should be understood, however, that such data may be obtained from a different source or sources, instead of or in addition to an SPS source. For example, positional data and/or velocity data may be derived or otherwise obtained from a different navigational-related apparatus and/or system.

The rotation $R_{RCU}^{ENU}$ may be computed using velocities derived from SPS data as shown in Equations (3)-(7):

$$R_{RCU}^{ENU} = \begin{bmatrix} \cos\gamma & -\sin\gamma & 0 \\ \sin\gamma & \cos\gamma & 0 \\ 0 & 0 & 1 \end{bmatrix} \tag{3}$$

where $$\cos\gamma = \frac{v_{SPS,North}}{v_{SPS,f}} \tag{4}$$

$$\sin\gamma = \frac{-v_{SPS,East}}{v_{SPS,f}} \tag{5}$$

$$v_{SPS,f} = \sqrt{v_{SPS,East}^2 + v_{SPS,North}^2}, \quad v_{SPS,f} > 0 \tag{6}$$

using the East and North components of the SPS velocity $$v_{SPS}^{ENU} = \begin{bmatrix} v_{SPS,East} \\ v_{SPS,North} \\ v_{SPS,Up} \end{bmatrix}. \tag{7}$$

In an example implementation, those points for which the horizontal SPS speed is larger than zero may be considered in this analysis. This can be accomplished using a minimum speed condition that is introduced below.

Figure 5:
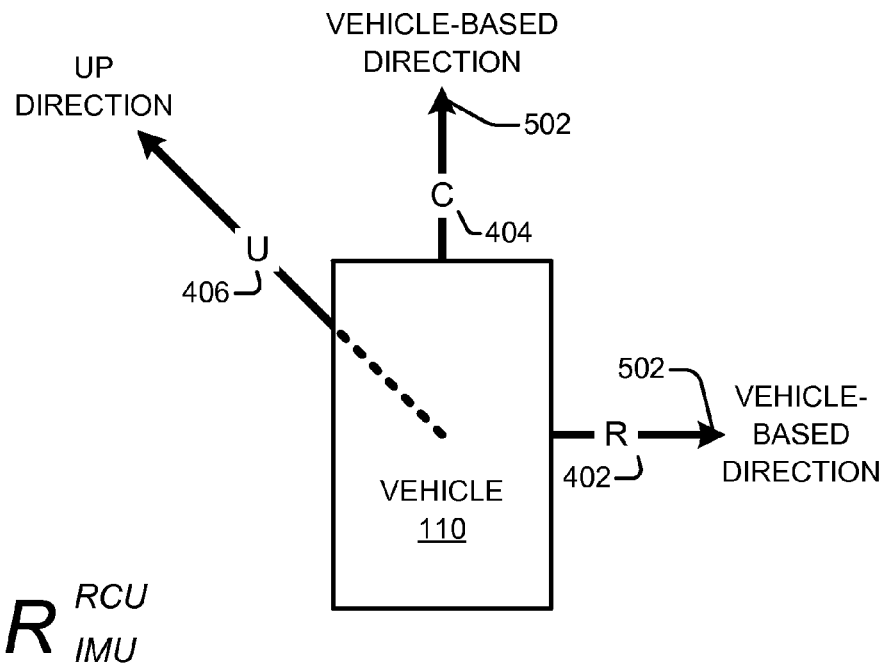
FIG. 5 graphically illustrates example potential vehicle-based directions for vehicle movements that result from typical structural aspects of a vehicle according to an implementation.
Figure 6:
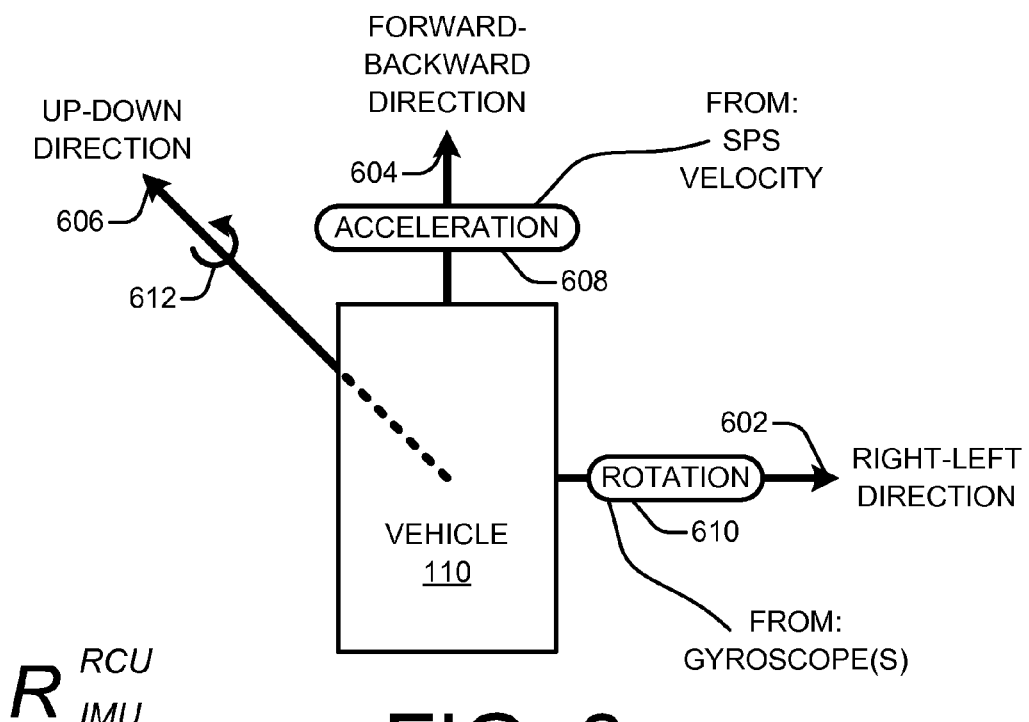
FIG. 6 graphically illustrates two example types of vehicle-based directions and two example types of obtainable vehicle-related movement data that may correlate with such vehicle-based directions according to an implementation.

The $R_{IUM}^{RCU}$ matrix is still to be ascertained so that $R_{IMU}^{ECEF}$ can be computed using Equation (1) above. FIGS. 5 and 6 illustrate concepts relevant to ascertaining an $R_{IMU}^{RCU}$ matrix.

FIG. 5 graphically illustrates example potential vehicle-based directions 502 for vehicle movements that result from typical structural aspects of a vehicle 110 according to an implementation. It is noted that the directions in which a vehicle is likely to move are constrained by the typical structural aspects of a vehicle. For instance, a vehicle may have multiple axels that constrain how a vehicle is propelled. Thus, a vehicle rarely moves (e.g., slides) sideways. If a mobile station is associated with an IMU that is fixed relative to a vehicle in which it is moving, these vehicle-related movement constraints may be effectively transferred to the IMU sensor frame.

Vehicle 110 may be considered to operate in a vehicle-based coordinate frame, such as the illustrated RCU coordinate frame. The up (U) direction 406 may continue to extend substantially parallel to the direction of gravity. It should be understood that the two directions (e.g., up and gravity) may not be identical for a number of reasons. By way of example only, the up direction may not be parallel to the direction of gravity as the vehicle traverses up, down, and over sloped portions of the earth. Nevertheless, up (U) direction 406 may still be considered substantially parallel to the direction of gravity.

For an example implementation, two vehicle-based directions 502 are shown in FIG. 5. One example vehicle-based direction 502 may correspond to a course-over-ground (C) direction 404. Another example vehicle-based direction 502 may correspond to a right (R) direction 402. These two vehicle-based directions 502 may be correlated to other data to facilitate a determination of the alignment of the IMU. Correlation operations are introduced below with particular reference to FIG. 6 and explained further thereafter.

FIG. 6 graphically illustrates two example types of vehicle-based directions and two example types of obtainable vehicle-related movement data that may correlate with such vehicle-based directions according to an implementation. As illustrated, there are three directions that are relevant to an IMU coordinate frame: a right-left direction 602; a forward-backward direction 604; and an up-down direction 606. As noted above, up-down direction 606 may correspond to up (U) direction 406 (of FIGS. 4 and 5).

In certain example implementations, example corresponding directions for vehicle-based directions 502 (of FIG. 5) include, but are not limited to, right-left direction 602 and forward-backward direction 604. More specifically, right-left direction 602 may correspond to right (R) direction 402 (of FIGS. 4 and 5), and forward-backward direction 604 may correspond to course-over-ground (C) direction 404 (of FIGS. 4 and 5). By associating identified vehicle directions (e.g., 602, 604, and/or 606) with vehicle-based directions (e.g., 402, 404, 406, and/or 502), directions that are associated with IMU measurements may be effectively realized in an RCU coordinate frame. Right-left direction 602, forward-backward direction 604, and/or up-down direction 606 may be identified using, for example, measurements acquired through an IMU. Such measurements may be accelerations, rotations, and so forth, just to name a few examples.

To identify such directions, one or more correlative indications may be ascertained and analyzed. In an example implementation, forward-back direction 604 may be identified based on at least one correlative indication that results from one or more correlation operations between and/or among accelerations measured by an IMU and accelerations 608 that are derived from velocity data that is obtained from SPS data. The SPS data may comprise, for example, positional data 210 and/or (e.g., direct) velocity data 212 (of FIG. 2). In another example implementation, right-left direction 602 may be identified based on at least one correlative indication that results from one or more correlation operations between and/or among accelerations measured by an IMU and rotational data 610. Rotational data 610 may be derived, for example, from rotational data 208 that are measured by gyroscopes (e.g., that may be included as part of the IMU) or from data that are otherwise measured or obtained via a different source. Rotational data 610 may reflect one or more rotations 612 (and/or portions thereof) about an axis corresponding to up-down direction 606.

Figure 7:
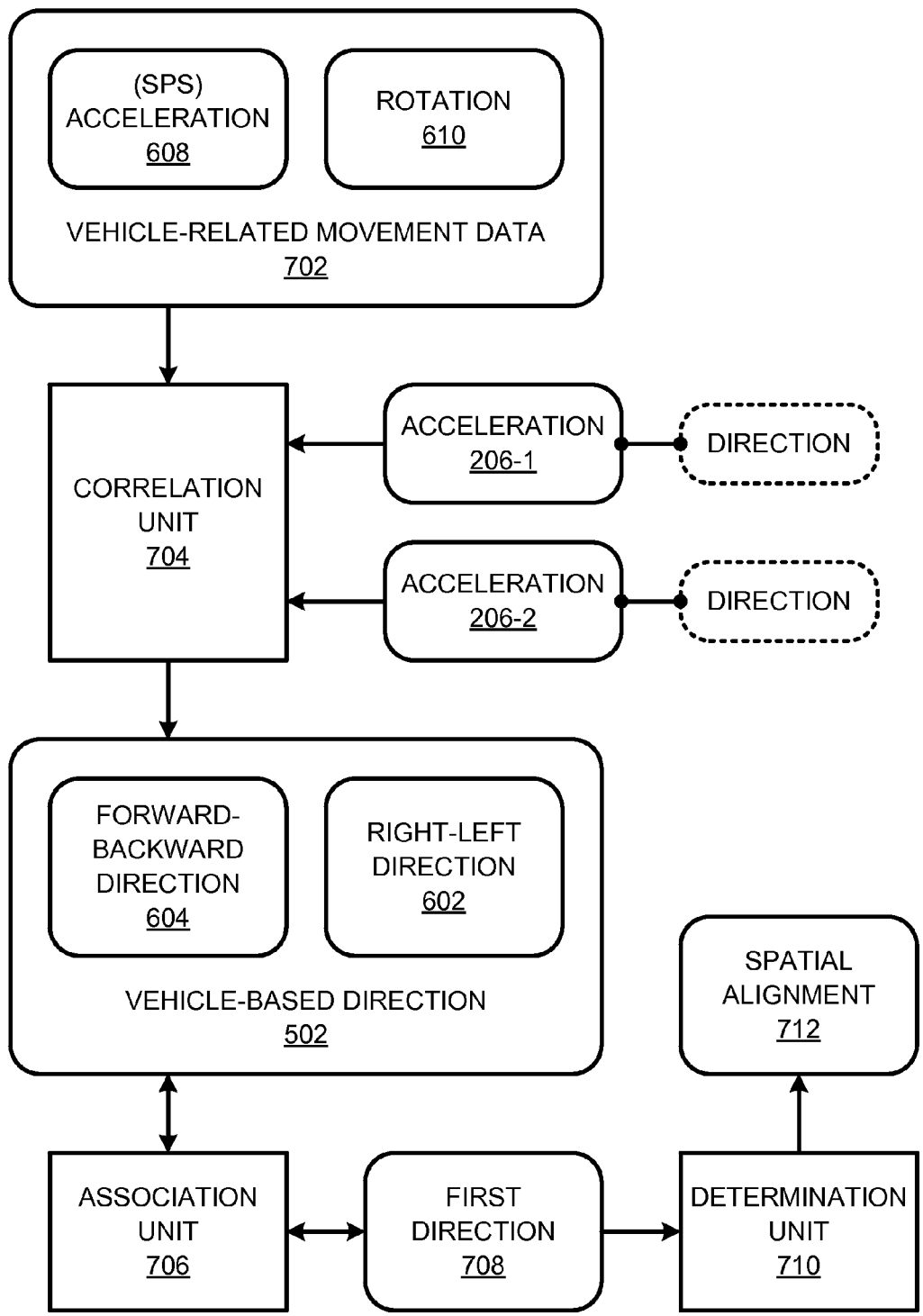
FIG. 7 is a schematic block diagram illustrating an example mechanism to determine a spatial alignment of an IMU according to an implementation.

FIG. 7 is a block diagram illustrating an example mechanism 700 to determine a spatial alignment of an IMU according to an implementation. As illustrated, mechanism 700 includes vehicle-related movement data 702, one or more correlation units 704, at least one association unit 706, a first direction 708, at least one determination unit 710, and a spatial alignment 712. Mechanism 700 also includes a first acceleration 206-1 and a second acceleration 206-2.

For certain example implementations, correlation unit 704 is to perform one or more correlation operations that relate to vehicle-related movement data 702 and at least one of first acceleration 206-1 or second acceleration 206-2. First acceleration 206-1 and second acceleration 206-2 may correspond to one or more of accelerations 206(1), 206(2), and/or 206(3) (of FIG. 2) as measured by an IMU. In other words, in an example implementation, first acceleration 206-1 and/or second acceleration 206-2 may equate to, be derived from, etc. one or a combination of accelerations 206 that are measured by one or more accelerometers 202 (of FIG. 2) of an IMU 102 (of FIGS. 1, 2, and 12). Each of first acceleration 206-1 and second acceleration 206-2 may include or be associated with a direction (as shown with dashed lines for mechanism 700) for the acceleration. Examples of vehicle-related movement data 702 may include, but are not limited to, SPS-derived acceleration 608, rotational data 610, and so forth. The correlation operations may result in at least one correlative indication.

Vehicle-based direction 502 may be identified based on the one or more correlation operations (e.g., based on the at least one correlative indication). As noted above, examples of vehicle-based directions 502 may include, but are not limited to, forward-backward direction 604 and right-left direction 602. Association unit 706 may associate the identified vehicle-based direction 502 with first direction 708. In other words, based on the one or more correlation operations, first direction 708 may be associated with at least one of the directions that is associated with first acceleration 206-1 or second acceleration 206-2.

First direction 708 may correspond to one of the directions in a vehicle-based coordinate frame (e.g., RCU). Hence, one of the directions that is associated with first acceleration 206-1 or second acceleration 206-2 may be associated with, for example, right (R) direction 402 or course-over-ground (C) direction 404 based on the one or more correlation operations. Determination unit 710 may determine a spatial alignment 712 of IMU 102 (of FIGS. 1, 2, and 12) based at least partially on first direction 708. The determination may entail one or more transformations. The rotation matrices of Equation (1), for example, may be used to determine spatial alignment 712.

A more detailed description of certain example aspects is described herein below with particular reference to a mechanism 900 of FIGS. 9-11. Mechanism 900 describes how one of first and second accelerations 206-1 or 206-2 may be used to identify one vehicle-based direction 502, and how the other of first and second accelerations 206-1 or 206-2 may be used to identify another vehicle-based direction 502. In this example manner, right-left direction 602 and forward-backward direction 604 may be identified. Mechanism 900 also describes how an up-down direction, which may be substantially parallel to a gravitational direction, may be identified using a third acceleration 206-3. It should be noted that the multiple directions of a vehicle-based coordinate frame (e.g., RCU) may be substantially orthogonal. If three directions are orthogonal, a third direction may be found from first and second directions. Hence, one of right-left direction 602 or forward-backward direction 604 may be found from the other if up-down direction 606 has been identified.

Figure 8:
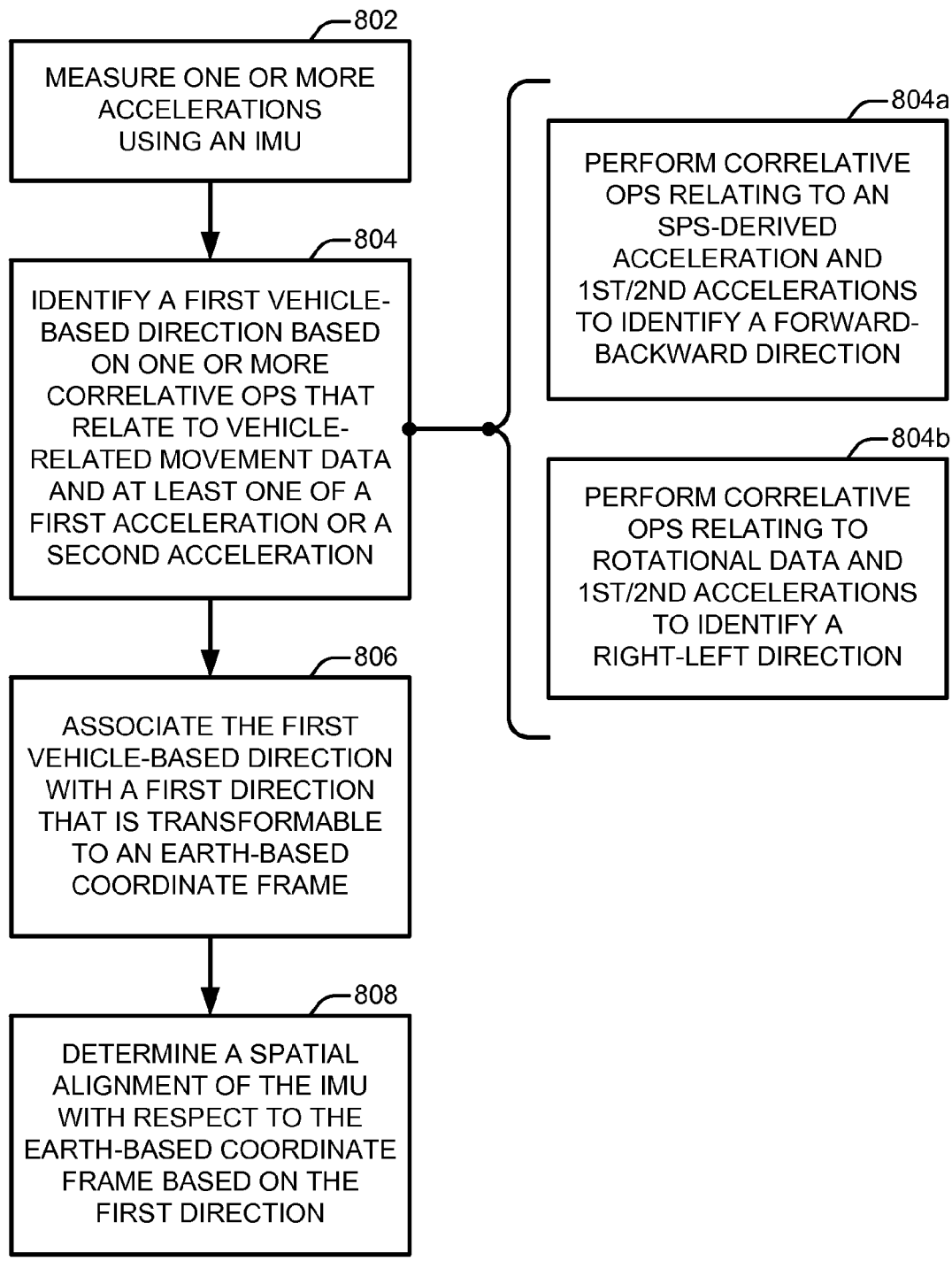
FIG. 8 is a flow diagram illustrating an example method for determining a spatial alignment of an IMU according to an implementation.

FIG. 8 is a flow diagram 800 illustrating an example method for determining a spatial alignment of an IMU according to an implementation. As illustrated, flow diagram 800 includes six operational blocks 802, 804, 804*a*, 804*b*, 806, and 808. Although operations 802-808 (including 804*a* and 804*b*) are shown and described in a particular order, it should be understood that methods may be performed in alternative manners without departing from claimed subject matter.

For certain example implementations, at operation 802, one or more accelerations may be measured using an IMU. At operation 804, a first vehicle-based direction may be identified based on one or more correlation operations that relate to vehicle-related movement data and at least one of a first acceleration or a second acceleration.

At operation 806, the first vehicle-based direction may be associated with a first direction that is transformable to an earth-based coordinate frame. At operation 808, a spatial alignment of the IMU may be determined with respect to the earth-based coordinate frame based on the first direction.

The spatial alignment may be utilized by the device that determines it and/or by another device. The spatial alignment may be communicated, for instance, to another device using a wired link (e.g., a direct connection, cabling, etc.) or a wireless link (e.g., infrared, Wi-Fi, Bluetooth®, cellular technology, etc.). A determined spatial alignment of the IMU may be applied, for example, to navigation performed by an SPS-INS or other navigational technology.

An operation (804) of identifying the first vehicle-based direction may be implemented using operation 804*a* and/or operation 804*b*. At operation 804*a*, one or more correlation operations relating to an SPS-derived acceleration and at least one of the first acceleration or the second acceleration may be performed to identify a forward-backward direction. At operation 804*b*, one or more correlation operations relating to rotational data and at least one of the first acceleration or the second acceleration may be performed to identify a right-left direction.

Figure 9:
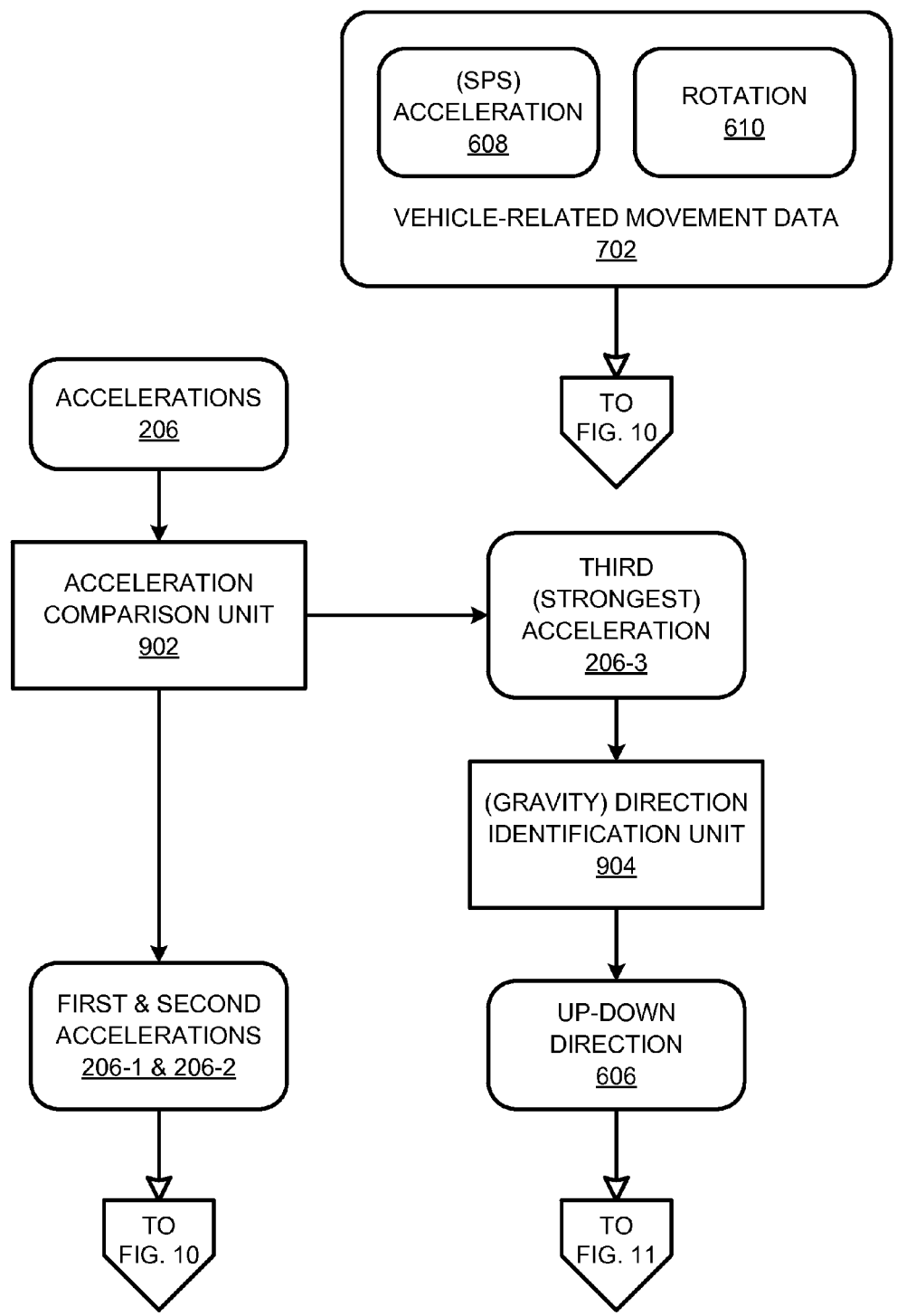
FIGS. 9, 10, and 11 are block diagrams that jointly illustrate another example mechanism to determine a spatial alignment of an IMU according to an implementation.
Figure 10:
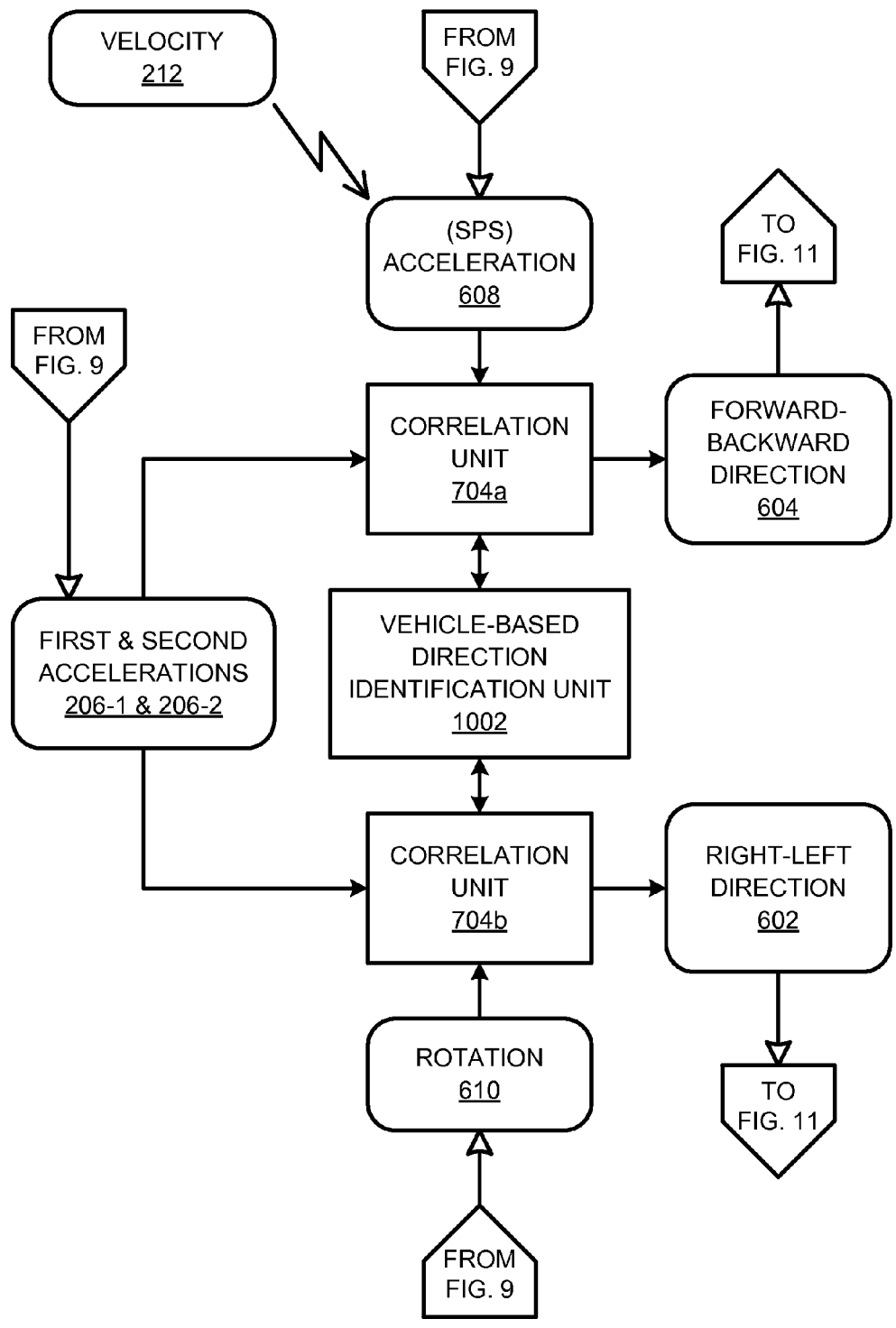
Figure 11:
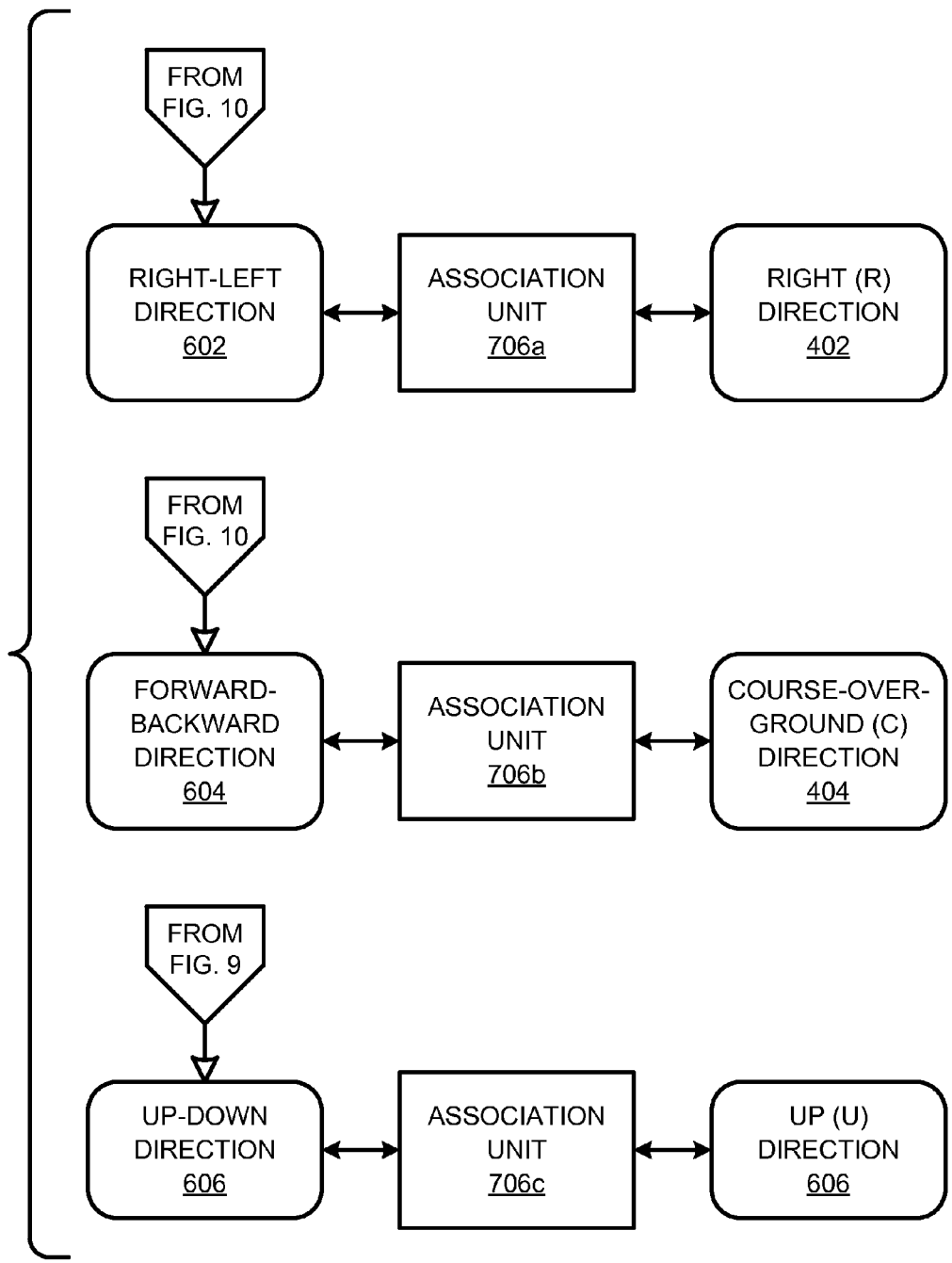

FIGS. 9, 10, and 11 are block diagrams illustrating another example mechanism 900 to determine a spatial alignment of an IMU according to an implementation. Mechanism 900 is distributed over FIGS. 9, 10, and 11. Mechanism 900 may be implemented using, for example, three accelerations: first acceleration 206-1, second acceleration 206-2, and third acceleration 206-3.

As illustrated, mechanism 900A in FIG. 9 includes an acceleration comparison unit 902 and a (gravitational) direction identification unit 904. For certain example implementations, accelerations 206 may be provided to acceleration comparison unit 902. Especially if raw measured accelerations 206 are provided to acceleration comparison unit 902, acceleration comparison unit 902 may process accelerations 206. For example, multiple accelerations over time may be filtered in one or more manners. For instance, the accelerations may be averaged over time. Regardless, acceleration comparison unit 902 may compare the multiple accelerations to ascertain which acceleration is the strongest. The strongest acceleration may be output as third acceleration 206-3.

Direction identification unit 904 obtains third acceleration 206-3 and ascertains a direction that is included in or at least associated therewith. The direction of (the strongest) third acceleration 206-3 is identified to be up-down direction 606. Because gravitational forces create the strongest acceleration, up-down direction 606 is at least substantially parallel to a gravitational direction. Up-down direction 606 is applied in FIG. 11.

The acceleration(s) that are not the strongest may be output by acceleration comparison unit 902 as first acceleration 206-1 and/or second acceleration 206-2. First and second accelerations 206-1 and 206-2 are applied in FIG. 10. Mechanism 900 also applies vehicle-related movement data 702. By way of example, vehicle-related movement data 702 may include SPS-derived acceleration 608, rotational data 610, and so forth. Vehicle-related movement data 702 is applied in FIG. 10.

As illustrated, mechanism 900B in FIG. 10 includes correlation unit 704*a*, correlation unit 704*b*, and vehicle-based direction identification unit 1002. First acceleration 206-1, second acceleration 206-2, SPS-derived acceleration 608, and rotational data 610 are provided from FIG. 9. For certain example implementations, first acceleration 206-1 and/or second acceleration 206-2 may be provided to correlation unit 704*a* and correlation unit 704*b*. Correlation unit 704*a* may perform one or more correlation operations between and/or among SPS-derived acceleration 608 and first acceleration 206-1 and/or second acceleration 206-2. The correlation operation(s) may produce at least one correlative indication. Based on the at least one correlative indication relating to SPS-derived acceleration 608, forward-backward direction 604 may be identified by vehicle-based direction identification unit 1002. For example, a direction for forward-backward direction 604 may be selected between a direction associated with first acceleration 206-1 and a direction associated with second acceleration 206-2. For instance, the direction associated with first acceleration 206-1 or second acceleration 206-2 having the higher correlation with SPS-derived acceleration 608 may be identified as forward-backward direction 604.

Correlation unit 704*b* may perform one or more correlation operations between and/or among rotational data 610 and first acceleration 206-1 and/or second acceleration 206-2. The correlation operation(s) may produce at least one correlative indication. Based on the at least one correlative indication relating to rotational data 610, right-left direction 602 may be identified by vehicle-based direction identification unit 1002. For example, a direction for right-left direction 602 may be selected between a direction associated with first acceleration 206-1 and a direction associated with second acceleration 206-2. For instance, the direction associated with first acceleration 206-1 or second acceleration 206-2 having the higher correlation with rotational data 610 may be identified as right-left direction 602.

The identification of right-left direction 602 and/or forward-backward direction 604 may involve additional analysis by vehicle-based direction identification unit 1002. For example, the at least one correlative indication may be compared to a predetermined threshold value that is to be satisfied (e.g., equaled or exceeded) before a direction is identified. Also, a threshold operation may be implemented that ensures that there is a predetermined threshold spread or difference between two correlative indications before a direction is identified (e.g., ensuring one correlative indication is sufficiently greater than the other). Furthermore, it may be checked that different correlation operations provide consistent results. Other analyses of correlative indications may alternatively be implemented prior to identifying a direction without departing from claimed subject matter. More detailed examples of analyses are described herein below in conjunction with example mathematical descriptions. Also, as noted above, after up-down direction 606 is identified, the identification of one of right-left direction 602 or forward-backward direction 604 enables the other to be identified using a principle of orthogonality (e.g., the right-hand rule).

As illustrated, mechanism 900A (of FIG. 9) identifies up-down direction 606, and mechanism 900B (of FIG. 9B) identifies right-left direction 602 and forward-backward direction 604. These identified directions may be considered to correspond to an IMU coordinate frame. Hence, these three identified directions may be associated with directions in a vehicle-based coordinate frame (e.g., an RCU coordinate frame) to associate them with directions that are transformable to an earth-based coordinate frame. An example association is shown in FIG. 11, where right-left direction 602 and forward-backward direction 604 from mechanism 900B are applied.

As illustrated, mechanism 900C in FIG. 11 includes association units 706a, 706b, and 706c. Up-down direction 606 is provided from FIG. 9. Right-left direction 602 and forward-backward direction 604 are provided from FIG. 10. For certain example implementations generally, association unit 706 may associate respective vehicle-based directions with respective directions that are transformable to an earth-based coordinate frame. More specifically, association unit 706a may associate right-left direction 602 with right (R) direction 402. Association unit 706b may associate forward-backward direction 604 with course-over-ground (C) direction 404. Association unit 706c may associate up-down direction 606 with up (U) direction 406.

Right (R) direction 402, course-over-ground (C) direction 404, and up (U) direction 406 are directions in a vehicle-based coordinate frame that may be transformed into an earth-based coordinate frame. They may be transformed, for example, using one or more rotation matrices. By way of example but not limitation, directions in the vehicle-based coordinate frame may be transformed into directions in a cardinal-direction-based coordinate frame. The directions in the cardinal-direction-based coordinate frame may be transformed into the earth-based coordinate frame.

Multiple example implementations are described further herein below from a relatively mathematical perspective. In a first example implementation that is described mathematically, accelerations that are measured by an IMU are analyzed and their eigenvectors are computed. The directions of the eigenvectors are used to identify vehicle-based directions. In a second example implementation that is described mathematically below, a two-dimensional eigenvector approach is implemented. In a third example implementation that is described mathematically below, a two-dimensional correlative approach that omits ascertainment of the eigenvectors is implemented. The latter two example implementations project accelerations onto a plane that is at least substantially orthogonal to the direction of gravity. As described herein above, the direction of gravity may not be obtained precisely (e.g., because of slopes on which a vehicle may be traveling). Other approaches may alternatively be implemented without departing from claimed subject matter.

In a first mathematically-described example implementation, six example operations may be implemented. First, the direction of gravity may be determined by averaging the measured accelerations. Second, the up-down, forward-backward, and lateral directions may be found as an overall group by finding the acceleration eigenvectors. Third, the upward direction may be identified by matching the up-down eigenvector to the direction of gravity and constructing the corresponding unit vector. Fourth, the "right" direction may be identified along the right-left axis by correlating the Z gyro data (e.g., the up gyroscope data) with the accelerometer measurements along the right-left axis. The corresponding unit vector may also be constructed.

Fifth, the forward direction may be identified by correlating the IMU acceleration along the forward-backward axis with an SPS-derived acceleration along the SPS velocity direction. The corresponding unit vector may also be constructed. Sixth, the rotation matrix between the vehicle and ECEF coordinate systems may be constructed using the unit vectors. It should be noted that fewer than all six operations may be implemented without departing from claimed subject matter. Also, the operations may be implemented in a different order without departing from claimed subject matter.

For the first operation, the direction of gravity can be used to (partially) align the IMU because the acceleration corresponding to gravity points upwards in the RCU frame, so after normalization it represents the upward axis in the RCU frame. Although the measurement of gravity that is obtained by the accelerometers is disturbed by the incidental accelerations of the vehicle, it is likely that the vehicle accelerations average out over time. Even if this assumption is not perfectly correct, the horizontal alignment error that may result is acceptable to successfully initialize the IMU. According to misalignment studies where the IMU data were rotated from the IMU frame into a misaligned frame by various amounts, initial IMU orientation errors of as much as, e.g., 10 degrees can be tolerated in order to successfully align the IMU after combined navigation with the SPS data is started.

According to the above assumption, the average acceleration vector d that is measured in the IMU sensor frame points upwards, opposing gravity, as shown in equation (8):

$$d = \frac{1}{n}\sum_{i=0}^{n-1} a_i, \tag{8}$$

where n is a suitably selected sample size. In order to minimize the effect of turning, those data points where the gyro readings are below an empirical threshold may be considered in accordance with equation (9):

$$a_i \,\forall i \, \|\omega_i\| < \omega_{threshold}. \tag{9}$$

In an actual implementation, the division by n in Equation (8) can be omitted because the length of d is not particularly important in the subsequent computations.

This example approach to the first operation works if the vehicle is in motion or if the vehicle happens to be stationary during these measurements. In fact, the approach may work better if the vehicle is stationary because obtaining the d vector in this way during a stationary period is effectively analogous to determining the roll and pitch angles that is a conventional method for initial stationary alignment.

For the second operation, vehicle axis directions may be ascertained. It is observed that in a road vehicle the horizontal components of the measured accelerations mostly, in an average sense, point to the directions of the lateral and forward vehicle body axes due to the mechanical build of such a vehicle. Vehicle speed changes show up in the forward-backward direction. Centripetal accelerations due to turns and gravity components due to roll show up in the right-left (e.g., lateral) direction. These dominant spatial directions of the accelerations may be ascertained using, for example, an eigenvector method.

First, the outer product of the measured acceleration vector may be computed for each epoch i:

$$A_i = \begin{bmatrix} a_{i,0} \\ a_{i,1} \\ a_{i,2} \end{bmatrix} \cdot [a_{i,0} \quad a_{i,1} \quad a_{i,2}], \tag{10}$$

then averaged for a suitable sample size n, for example n=60:

$$A = \frac{1}{n}\sum_{i=0}^{n-1} A_i. \tag{11}$$

In an actual implementation, the division by n can be omitted because the absolute magnitude of the matrix elements is not particularly important in the subsequent computations. Instead, their relative magnitudes may be used.

In order to minimize the directional uncertainties resulting from low speed, those data points where the SPS velocity is above an empirically determined threshold may be considered using Equations (12) and (13):

$$a_i \; \forall i \; v_{SPS,f,i} > v_{threshold} \tag{12}$$

$$v_{SPS,f,i} = \sqrt{v_{SPS,East,i}^2 + v_{SPS,North,i}^2}. \tag{13}$$

After solving for the following in Equation (14):

$$A \cdot e_k = \lambda_k \cdot e_k, \; k=0, 1, 2, \tag{14}$$

the eigenvectors $e_0, e_1, e_2$ and their corresponding eigenvalues $\lambda_0, \lambda_1, \lambda_2$ may be considered. These eigenvectors are ordered and named such that $|\lambda_0| \leq |\lambda_1| \leq |\lambda_2|$. Herein, these may also at times be referred to as the first, second, and third accelerations, respectively.

For the third operation, the up-down unit vector (e.g., which is an example of an up-down direction 606) may be identified. The eigenvector corresponding to the largest eigenvalue provides the direction of gravity, aside from its sign. The sign of $e_2$ is adjusted knowing that d points upwards using Equations (15) and (16):

$$\text{if } e_2 \cdot d > 0 \text{ then } u = e_2 \tag{15}$$

$$\text{if } e_2 \cdot d < 0 \text{ then } u = -e_2 \tag{16}$$

where u is the up-down pointing unit vector.

For the fourth operation, the right pointing unit vector (e.g., which is an example of a right-left direction 602) may be identified. It is observed that the vertical gyro component may be highly correlated with the lateral acceleration. This can be used to select the lateral body axis of the vehicle. As seen in the second operation, one of $e_0$ and $e_1$ lies in the lateral direction. Two candidates corresponding to the two horizontal unit vectors $e_0$ and $e_1$ are prepared. One or more correlation operations may be performed to identify and select between these two candidates. For example, the candidate that gives the better correlation may be selected.

The vertical gyro component and the two potential IMU accelerations may be ascertained as follows in Equations (17)-(21):

$$\omega_{u,i} = u \cdot \omega_i \tag{17}$$

$$a_{IMU,f,0,i} = e_0 \cdot a_i \tag{18}$$

$$a_{IMU,f,1,i} = e_1 \cdot a_i \tag{19}$$

conditional to $$a_i, \omega_i \; \forall i \; v_{SPS,f,i} > v_{threshold} \tag{20}$$

$$v_{SPS,f,i} = \sqrt{v_{SPS,East,i}^2 + v_{SPS,North,i}^2}. \tag{21}$$

Then two example correlative indications may be ascertained using the following Equations (22)-(28):

$$c_{0,0} = \text{Corr}(a_{IMU,f,0,i}, -\omega_{u,i})_{i=0,\ldots,n-1} \tag{22}$$

$$c_{0,1} = \text{Corr}(a_{IMU,f,1,i}, -\omega_{u,i})_{i=0,\ldots,n-1} \tag{23}$$

where $$\text{Corr}(x_i, y_i)_{i=0,\ldots,n-1} = \frac{1}{n \cdot \sigma_x \cdot \sigma_y} \sum_{i=0}^{n-1} (x_i - \bar{x}) \cdot (y_i - \bar{y}) \tag{24}$$

with $$\bar{x} = \frac{1}{n}\sum_{i=0}^{n-1} x_i \tag{25}$$

$$\bar{y} = \frac{1}{n}\sum_{i=0}^{n-1} y_i \tag{26}$$

and $$\sigma_x = \sqrt{\frac{1}{n}\sum_{i=0}^{n-1} (x_i - \bar{x})^2} \tag{27}$$

$$\sigma_y = \sqrt{\frac{1}{n}\sum_{i=0}^{n-1} (y_i - \bar{y})^2}. \tag{28}$$

The negative sign before $\omega_{u,i}$ in Equations (22) and (23) expresses the fact that the gyro rate and the right-pointing acceleration are 180° out of phase. The correlation coefficient (e.g., which is an example of a correlative indication) with the larger magnitude may be used to select the $e_0$ or $e_1$ vector as the right-left direction, and its sign may determine the direction. The following analyses may be performed on the correlation coefficients to identify the direction as shown in Equations (29)-(32):

$$\text{If } |c_{0,0}| < 0.5 \text{ and } |c_{0,1}| < 0.5 \text{ then inconclusive} \tag{29}$$

else $$\text{If } ||c_{0,0}| - |c_{0,1}|| < 0.2 \text{ then inconclusive} \tag{30}$$

else $$\text{if } |c_{0,0}| < |c_{0,1}| \text{ then } e_r = e_1, c_r = c_{0,1} \tag{31}$$

$$\text{else } e_r = e_0, c_r = c_{0,0} \tag{32}$$

Equation (29) ensures that the correlative indication of the selected direction is sufficiently strong. A value other than 0.5 (either greater or less than 0.5) may alternatively be used. Equation (30) ensures that the differential between the two correlative indications is sufficiently great. A value other than 0.2 (either greater or less than 0.2) may alternatively be used. It should be noted that other analyses of the correlation operations and/or the resulting correlative indications may alternatively be implemented.

The vector for $r_0$ may be determined as shown in Equation (33):

$$r_0 = \text{sign}(c_r) \cdot e_r. \tag{33}$$

As noted above, a third (e.g., in this case, the forward pointing) unit vector may be obtained based on the at least substantial orthogonality among the three directions. For example, the forward pointing unit vector may be obtained by the cross product of u and $r_0$:

$$f_0 = u \times r_0. \tag{34}$$

For the fifth operation, a forward unit vector (e.g., an example of a forward-backward direction 604) may be identified. Due to a vehicle's mechanical build, the horizontal velocity typically points to the forward direction of the vehicle, except while turning. Consequently, its time derivative, the forward acceleration, is highly correlated with the forward acceleration measured in the IMU frame. As shown in the second operation above, one of $e_0$ and $e_1$ lies in the forward-backward direction. In order to ascertain which one, one or more correlation operations may be performed. For example, at least one correlative indication derived from a correlation between the forward acceleration as computed from SPS-based velocities and the forward acceleration in the directions of $e_0$ and $e_1$, respectively, may be computed. The higher correlation magnitude can be used to identify and select the forward axis.

The SPS acceleration may be computed from Equations (35) and (36):

$$v_{SPS,f,i} = \sqrt{v_{SPS,East,i}^2 + v_{SPS,North,i}^2} \tag{35}$$

$$a_{SPS,f,i} = \frac{v_{SPS,f,i} - v_{SPS,f,i-1}}{\Delta t}, \tag{36}$$

where $\Delta t$ is the time difference between epochs i and i−1.

On the other hand, the forward IMU acceleration candidates may be ascertained by projecting the measured acceleration vector to the horizontal eigenvectors, respectively, as shown in Equations (37) and (38):

$$a_{IMU,f,0,i} = e_0 \cdot a_i \tag{37}$$

$$a_{IMU,f,1,i} = e_1 \cdot a_i, \tag{38}$$

where the i-th measurement for i=0, ..., n−1 may be selected such that the gyro readings are smaller than a selected threshold, in order to minimize the effect of turns, and SPS velocity is large enough to provide better acceleration accuracy. These example constraints may be enforced with Equation (39):

$$a_i, a_{SPS,f,i} \; \forall i \; \|\omega_i\| < \omega_{threshold}, \; v_{SPS,f,i} > v_{threshold} \tag{39}$$

The SPS velocities may be matched to each epoch i. The gyro threshold may be empirically determined For example, the gyro threshold may be determined as shown in Equation (40):

$$\omega_{threshold} = 5°/s. \tag{40}$$

One or more correlation operations may further be performed by ascertaining at least one correlative indication. For example, correlation coefficients (e.g., which are examples of correlative indications) may be computed as shown in Equation (41) and (42):

$$c_{1,0} = \text{Corr}(a_{IMU,f,0,i}, a_{SPS,f,i})_{i=0,\ldots,n-1} \tag{41}$$

$$c_{1,1} = \text{Corr}(a_{IMU,f,1,i}, a_{SPS,f,i})_{i=0,\ldots,n-1}. \tag{42}$$

The higher $c_k$ coefficient may be used to select the $e_0$ or $e_1$ vector, and its sign may determine the direction. Correlative thresholds may be applied as part of a correlative analysis for the one or more correlation operations. Examples analyses are provided in Equations (43) to (47) below and explained hereinabove with regard to the fourth operation.

if $|c_{1,0}| < 0.5$ and $|c_{1,1}| < 0.5$ then inconclusive (43)

else if $\||c_{1,0}| - |c_{1,1}|\| < 0.2$ then inconclusive (44)

else

If $|c_{1,0}| < |c_{1,1}|$ then $e_f = e_1$, $c_f = c_{1,1}$ (45)

else $e_f = e_0$, $c_f = c_{1,0}$ (46)

From this thresholding analysis, the forward unit vector may be identified as shown in Equation (47):

$$f_1 = \text{sign}(c_f) \cdot e_f \tag{47}$$

If a third (e.g., right pointing) unit vector is to be obtained without one or more direct correlation operations, the right hand rule may be employed due to their orthogonality with the up direction. Thus, the right point unit vector may be obtained by the cross product of u and $f_1$, as shown in Equation (48):

$$r_1 = f_1 \times u. \tag{48}$$

For the sixth operation, a rotation matrix between the IMU frame and the ECEF frame may be determined The fourth and fifth operations may give consistent results. In other words, the following from Equations (49) and (50) usually holds true:

$$r_1 = r_0 \tag{49}$$

$$f_1 = f_0. \tag{50}$$

Hence, the following may be defined in Equations (51) and (52):

$$r = r_1 = r_0 \tag{51}$$

$$f = f_1 = f_0. \tag{52}$$

The equalities in Equations (49) and (50) may not be numerically evaluated, due to numerical inaccuracies, but they may be used to verify that $e_r$ and $e_f$ select different $e_k$ vectors (e.g., k=0 or 1).

If both the fourth and fifth operations provide results, but these results are inconsistent (e.g., if both $e_r$ and $e_f$ select the same $e_k$ (k=0 or 1)), then the alignment determination can be repeated on a new set of n measurements. If one of the fourth and fifth operations fails or provides inconclusive results (e.g., the correlation coefficients are too close in value or both are too low), the axes derived by the other operation may be used. For example, if the fourth operation fails, then:

$$r = r_1 \tag{53}$$

$$f = f_1. \tag{54}$$

If both the fourth and fifth operations fail, then the alignment determination may be repeated on a new set of n measurements.

Once the right pointing unit vector r and the forward pointing unit vector f are available, the up pointing unit vector u (as identified in the third operation) may be used to complete the coordinate system by associating these unit vectors with the basis vectors of a vehicle-based coordinate system, such as RCU. Thus, the rotation matrix $R_{IMU}^{RCU}$ may be constructed as shown in Equation (55):

$$R_{IMU}^{RCU} = \begin{bmatrix} r_0 & r_1 & r_2 \\ f_0 & f_1 & f_2 \\ u_0 & u_1 & u_2 \end{bmatrix}_{IMU}^{RCU} \tag{55}$$

because r, f, and u are the 3 basis vectors of system RCU as expressed in the IMU system. Finally, the transformation from the IMU system to the ECEF system may be accomplished using the following Equation (56) with one or more rotations:

$$R_{IMU}^{ECEF} = R_{ENU}^{ECEF} R_{RCU}^{ENU} R_{IMU}^{RCU} \tag{56}$$

For a second mathematically-described example implementation, a two-dimensional eigenvector approach is employed. More specifically, this approach of determining the r and f unit vectors may involve a two-dimensional eigenvector solution. Instead of ascertaining the eigenvector triplet $e_0, e_1, e_2$ using the full three-dimensional accelerations, the horizontal eigenvector pair $e_0, e_1$ may be ascertained after projecting the accelerations onto a horizontal plane. The horizontal plane may be determined using the vertical d vector by ascertaining a plane that is at least substantially orthogonal thereto.

This approach may include the following operations. First, the direction of gravity may be obtained by averaging the measured accelerations. Second, the horizontal plane may be ascertained to be the one that is substantially orthogonal to the vertical direction. Third, the forward-backward and right-left directions may be identified as a group by finding the eigenvectors from accelerations that are projected onto the horizontal plane. The remaining operations may be the same as those described above for the three-dimensional eigenvector approach to individually identify the forward-backward direction and the right-left (lateral) direction.

For a third mathematically-described example implementation, a two-dimensional correlative approach is employed that need not involve eigenvectors. More specifically, this approach may entail identifying the forward-backward and right-left directions from the accelerations projected onto the horizontal plane directly, without the involvement of eigenvectors. This "two-dimensional correlation" may be used to ascertain the direction in the horizontal plane where the correlation between the projected accelerations and the computed SPS accelerations is the highest; this may be used to identify the forward-backward direction. Similarly, a correlation with the vertical gyro component may identify the right-left (lateral) direction. In an example variation of this two-dimensional correlative approach, the two correlation operations may be combined to provide the forward and lateral directions at once, with the constraint that these two directions are to be orthogonal in the horizontal plane.

Figure 12:
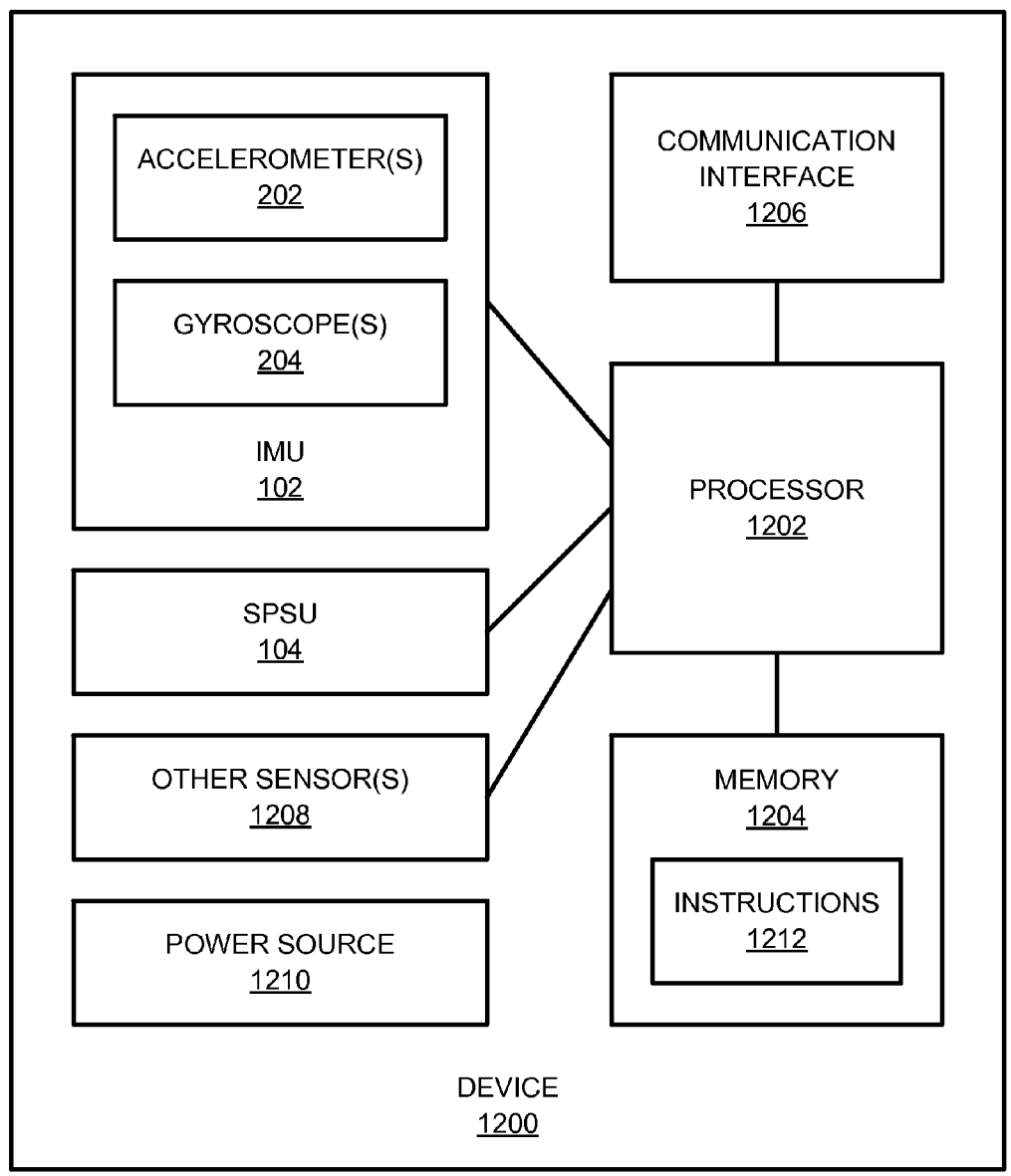
FIG. 12 is a schematic diagram illustrating an example device, according to an implementation, that may implement one or more aspects for determining a spatial alignment of an IMU.

FIG. 12 is a schematic diagram illustrating an example device 1200, according to an implementation, that may implement one or more aspects for determining a spatial alignment of an IMU. As illustrated, device 1200 includes at least one processor 1202, one or more memories 1204, at least one communication interface 1206, other sensor(s) 1208, and at least one power source 1210. Memory 1204 is illustrated as including instructions 1212. Device 1200 is also shown to include an IMU 102 and an SPSU 104. IMU 102 is shown to include one or more accelerometers 202 and one or more gyroscopes 204. However, a device 1200 may alternatively include more, fewer, and/or different components from those that are illustrated.

For certain example implementations, device 1200 may include and/or comprise an electronic device. Examples for device 1200 may include, but are not limited to, a mobile station 106 (of FIG. 1), a portable electronic device, a computer, a mobile internet device (MID), an entertainment device, any electronic device having at least one processor and/or memory, some combination thereof, and so forth. Power source 1210 may provide power to the components and/or circuitry of device 1200. Power source 1210 may be a portable power source, such as a battery, or a fixed power source, such as an outlet in a car, house, or other building. Power source 1210 may be integrated with or separate from device 1210.

Processor 1202 may comprise any one or more processing units. Memory 1204 may contain measured accelerations, rotations, and so forth. It may also store physical versions of the variables, parameters, etc. that are described herein as being manipulated. Memory 1204 may also be utilized to store instructions 1212 (e.g., a program, application, etc. or portion thereof; processor-executable instructions; code; some combination thereof; and so forth) that may be executable by processor 1202. Execution of such instructions 1212 by one or more processors 1202 may transform device 1200 into a special-purpose computing device, apparatus, platform, some combination thereof, and so forth.

Communication interface 1206 may provide an interface between device 1200 and human operators and/or other devices. Hence, communication interface 1206 may include a screen, speaker, keys, or other human input/output device(s). Communication interface 1206 may include a transceiver, a radio, an antenna, a wired interface apparatus, some combination thereof, etc. to communicate wireless and/or wired signals. Communication interface 1206 may also serve as a bus or other interconnect between and/or among the other components of device 1200. Other sensor(s) 1208, if present, may comprise one or more other miscellaneous sensors that are capable of measuring other parameters. Other sensor(s) 1208 may include a magnetometer, a compass, etc., just to name a few examples.

Methodologies described herein may be implemented by various means depending upon applications according to particular features and/or examples. For example, such methodologies may be implemented in hardware, firmware, software, discrete/fixed logic circuitry, any combination thereof, and so forth. In a hardware and/or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, and/or combinations thereof, just to name a few examples.

For a firmware and/or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

In one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer and/or processor thereof. Disk and disc, as used herein, includes compact disc (CD), laser disc, optical disc, digital versatile disc (DVD), floppy disk and blu-ray disc where disks usually reproduce data magnetically, while discs reproduce data optically with lasers.

Also, computer instructions/code may be transmitted via signals over physical transmission media from a transmitter to a receiver. For example, software may be transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical and/or magnetic signals capable of being stored, transferred, combined, compared, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, and/or magnetic quantities within memories, registers, or other information storage devices, transmission devices, or display devices of the special purpose computer or similar special purpose electronic computing device.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concepts described herein. Therefore, it is intended that claimed subject matter not be limited to the particular examples disclosed, but that such claimed subject matter may also include all aspects falling within the scope of appended claims, and equivalents thereof.

What is claimed is:

1. A device for determining the spatial alignment of an inertial measurement unit (IMU) positioned in or on a vehicle comprising:
    means for obtaining vehicle-related movement data for the vehicle (110) including velocity data measured by or derived from measurements obtained by one or more satellite positioning systems (SPSs), the velocity data including an SPS-based acceleration;
    means for obtaining at least a first IMU-derived acceleration and a second IMU-derived acceleration, each of the IMU-derived accelerations being measured by or derived from measurements obtained by the IMU and corresponding to a respective acceleration of the vehicle, the IMU being located on or in the vehicle;
    means for performing one or more operations on the vehicle-related movement data and one or more of the IMU-derived accelerations to determine a respective correlation between the SPS-based acceleration and one or more of the IMU-derived accelerations,
    means for identifying a direction of one of the IMU-derived accelerations having a higher correlation with the SPS-based acceleration as a first vehicle direction;
    means for determining a first Earth-based direction in an Earth-based coordinate system based on the first vehicle direction; and
    means for determining a spatial alignment of the IMU with respect to the Earth-based coordinate system based on the first Earth-based direction.

2. The device of claim 1, wherein the IMU-derived accelerations further include a third IMU-derived acceleration, and wherein the first, second and third IMU-derived accelerations are substantially orthogonal.

3. The device of claim 2, further comprising means for identifying the weakest two of the three IMU-derived accelerations as the first IMU-derived acceleration and the second IMU-derived acceleration.

4. The device of claim 3, comprising means for identifying the strongest one of the three MU-derived accelerations as acceleration due to gravity.

5. The device of claim 1, wherein the vehicle-related movement data further includes rotational data obtained or derived from one or more gyroscopes each arranged to measure a respective rotation of the IMU.

6. The device of claim 5, further comprising means for performing one or more second correlation operations between the rotational data and one or both of the first and second IMU-derived accelerations.

7. The device of claim 6, further comprising means for identifying the direction of the one of the first and second accelerations having the greatest correlation with the rotational data as a second vehicle direction, wherein determining the first Earth-based direction is also based at least in part on the second vehicle direction.

8. The device of claim 7, wherein the first vehicle direction corresponds to a "forward-backward" movement direction of the vehicle in an IMU-based coordinate system.

9. The device of claim 8, wherein the second vehicle direction corresponds to a "right-left" movement direction of the vehicle in the IMU-based coordinate system.

10. The device of claim 7, wherein the means for determining the first Earth-based direction in the Earth-based coordinate system includes:

means for determining a first vehicle-based direction based at least in part on one or both of the first vehicle direction and the second vehicle direction; and means for determining the first Earth-based direction in the Earth-based coordinate system based on the first vehicle-based direction.

11. The device of claim 10, wherein the first vehicle-based direction corresponds to a "course-over-ground" movement direction of the vehicle in a first RCU (Right, Course-over-ground, Up)-based coordinate system.

12. The device of claim 11, further comprising means for determining a second vehicle-based direction based on at least one of the first and second vehicle directions, the second vehicle-based direction corresponding to a "right" movement direction of the vehicle in the first RCU-based coordinate system.

13. The device of claim 12, further comprising means for transforming the second vehicle-based direction into a second Earth-based direction in the Earth-based coordinate system, wherein determining the spatial alignment of the IMU with respect to the Earth- based coordinate system is also based on the second Earth-based direction.

14. The device of claim 1, wherein the velocity data corresponds to movement of the vehicle in a first SPS-based coordinate system.

15. The device of claim 1, wherein the SPS- and IMU-derived accelerations are linear accelerations.

16. The device of claim 1, wherein the vehicle-related movement data further includes geodetic data obtained from one or more SPSs, the geodetic data corresponding to a position of the vehicle in a first geodetic coordinate system.

17. The device of claim 16, further comprising means for determining a first transformation matrix based on the geodetic data, the first transformation matrix being usable to convert between an RCU-based coordinate system and an Earth-based coordinate system.

18. The device of claim 17, further comprising means for determining a second transformation matrix based on the vehicle-related movement data, the second transformation matrix being usable to convert between an IMU-based coordinate system and an RCU-based coordinate system.

19. The device of claim 1, wherein the IMU is detachably secured either directly or indirectly to the vehicle during the measurements by the IMU such that a position and an alignment of the IMU is constant relative to the vehicle during the measurements by the IMU.

20. The device of claim 1, wherein one or both of the first IMU-derived acceleration and the second IMU-derived acceleration are derived using an eigenvector.

21. A computer readable storage medium having stored thereon instructions executable by one or more processors for determining the spatial alignment of an inertial measurement unit (IMU) positioned in or on a vehicle, the instructions when executed by the one or more processors operable to cause the one or more processors to:

obtain vehicle-related movement data for the vehicle including velocity data measured by or derived from measurements obtained by one or more satellite positioning systems (SPSs), the velocity data including an SPS-based acceleration;

obtain at least a first IMU-derived acceleration and a second IMU-derived acceleration, each of the IMU-derived accelerations being measured by or derived from measurements obtained by the IMU and corresponding to a respective acceleration of the vehicle, the IMU being located on or in the vehicle;

perform one or more operations on the vehicle-related movement data and one or more of the IMU-derived accelerations to determine a respective correlation between the SPS-based acceleration and one or more of the IMU-derived accelerations, identify a direction of one of the first or second IMU-derived accelerations having a higher correlation with the SPS-based acceleration as a first vehicle direction;

determine a first Earth-based direction in an Earth-based coordinate system based on the first vehicle direction; and determine a spatial alignment of the MU with respect to the Earth-based coordinate system based on the first Earth-based direction.

22. The computer readable storage medium of claim 21, wherein the IMU-derived accelerations further include a third MIU-derived acceleration, and wherein the first, second and third IMU-derived accelerations are substantially orthogonal.

23. The computer readable storage medium of claim 22, wherein the instructions when executed are further operable to cause the one or more processors to identify the weakest two of the three IMU-derived accelerations as the first IMU-derived acceleration and the second IMU-derived acceleration.

24. The computer readable storage medium of claim 23, wherein the instructions when executed are further operable to cause the one or more processors to identify the strongest one of the three WILT-derived accelerations as acceleration due to gravity.

25. The computer readable storage medium of claim 21, wherein the vehicle-related movement data further includes rotational data obtained or derived from one or more gyroscopes each arranged to measure a respective rotation of the IMU.

26. The computer readable storage medium of claim 25, wherein the instructions when executed are further operable to cause the one or more processors to perform one or more second correlation operations between the rotational data and one or both of the first and second IMU-derived accelerations.

27. The computer readable storage medium of claim 26, wherein the instructions when executed are further operable to cause the one or more processors to identify the direction of the one of the first and second accelerations having the greatest correlation with the rotational data as a second vehicle direction, wherein determining the first Earth-based direction is also based at least in part on the second vehicle direction.

28. The computer readable storage medium of claim 27, wherein the first vehicle direction corresponds to a "forward-backward" movement direction of the vehicle in an IMU-based coordinate system.

29. The computer readable storage medium of claim 28, wherein the second vehicle direction corresponds to a "right-left" movement direction of the vehicle in the IMU-based coordinate system.

30. The computer readable storage medium of claim 27, wherein determining the first Earth-based direction in the Earth-based coordinate system includes:

determining a first vehicle-based direction based at least in part on one or both of the first vehicle direction and the second vehicle direction; and determining the first Earth-based direction in the Earth-based coordinate system based on the first vehicle-based direction.

31. The computer readable storage medium of claim 30, wherein the first vehicle-based direction corresponds to a "course-over-ground" movement direction of the vehicle in a first RCU (Right, Course-over-ground, Up)-based coordinate system.

32. The computer readable storage medium of claim 31, wherein the instructions when executed are further operable to cause the one or more processors to determine a second vehicle-based direction based on at least one of the first and second vehicle directions, the second vehicle-based direction corresponding to a "right" movement direction of the vehicle in the first RCU-based coordinate system.

33. The computer readable storage medium of claim 32, wherein the instructions when executed are further operable to cause the one or more processors to transform the second vehicle-based direction into a second Earth-based direction in the Earth-based coordinate system, wherein determining the spatial alignment of the MU with respect to the Earth- based coordinate system is also based on the second Earth-based direction.

34. The computer readable storage medium of claim 21, wherein the velocity data corresponds to movement of the vehicle in a first SPS-based coordinate system.

35. The computer readable storage medium of claim 21, wherein the SPS- and IMU-derived accelerations are linear accelerations.

36. The computer readable storage medium of claim 21, wherein the vehicle-related movement data further includes geodetic data obtained from one or more SPSs, the geodetic data corresponding to a position of the vehicle in a first geodetic coordinate system.

37. The computer readable storage medium of claim 36, wherein the instructions when executed are further operable to cause the one or more processors to determine a first transformation matrix based on the geodetic data, the first transformation matrix being usable to convert between an RCU-based coordinate system and an Earth-based coordinate system.

38. The computer readable storage medium of claim 37, wherein the instructions when executed are further operable to cause the one or more processors to determine a second transformation matrix based on the vehicle-related movement data, the second transfommtion matrix being usable to convert between an IMU-based coordinate system and an RCU-based coordinate system.

39. The computer readable storage medium of claim 21, wherein the IMU is detachably secured either directly or indirectly to the vehicle during the measurements by the IMU such that a position and an alignment of the IMU is constant relative to the vehicle during the measurements by the IMU.

40. The computer readable storage medium of claim 21, wherein one or both of the first IMU-derived acceleration and the second IMIJ-derived acceleration are derived using an eigenvector.

41. A method for determining a spatial alignment of an inertial measurement unit (IMU) coupled with a mobile device, the IMU being positioned in or on a vehicle, the method comprising:
  obtaining, by one or more processors, vehicle-related movement data for the vehicle including velocity data measured by or derived from measurements obtained by one or more satellite positioning systems (SPSs), the velocity data including an SPS-based acceleration;
  obtaining, by one or more processors, at least a first IMU-derived acceleration and a second IMU-derived acceleration, each of the IMU-derived accelerations being measured by or derived from measurements obtained by the and corresponding to a respective acceleration of the vehicle, the IMU being located on or in the vehicle;
  performing, by one or more correlation units, one or more operations on the vehicle-related movement data and one or more of the IMU-derived accelerations to determine a respective correlation between the SPS-based acceleration and one or more of the IMU-derived accelerations,
  identifying, by one or more direction identification units, a direction of one of the first or second IMU-derived accelerations having a higher correlation with the SPS-based acceleration as a first vehicle direction;
  determining, by one or more association units, a first Earth-based direction in an Earth-based coordinate system based on the first vehicle direction; and
  determining, by one or more determination units, a spatial alignment of the IMU with respect to the Earth-based coordinate system based on the first Earth-based direction.

42. The method of claim 41, wherein the IMU-derived accelerations further include a third IMU-derived acceleration, and wherein the first, second and third IMU-derived accelerations are substantially orthogonal.

43. The method of claim 42, further comprising identifying the weakest two of the three IMU-derived accelerations as the first IMU-derived acceleration and the second IMU-derived acceleration.

44. The method of claim 43, further comprising identifying the strongest one of the three IMU-derived accelerations as acceleration due to gravity.

45. The method of claim 41, wherein the vehicle-related movement data further includes rotational data obtained or derived from one or more gyroscopes each arranged to measure a respective rotation of the IMU.

46. The method of claim 45, further comprising performing one or more second correlation operations between the rotational data and one or both of the first and second IMU-derived accelerations.

47. The method of claim 46, further comprising identifying the direction of the one of the first and second accelerations having the greatest correlation with the rotational data as a second vehicle direction, wherein determining the first Earth-based direction is also based at least in part on the second vehicle direction.

48. The method of claim 47, wherein the first vehicle direction corresponds to a "forward-backward" movement direction of the vehicle in an IMU-based coordinate system.

49. The method of claim 48, wherein the second vehicle direction corresponds to a "right-left" movement direction of the vehicle in the IMU-based coordinate system.

50. The method of claim 47, wherein determining the first Earth-based direction in the Earth-based coordinate system includes:
  determining a first vehicle-based direction based at least in part on one or both of the first vehicle direction and the second vehicle direction; and
  determining the first Earth-based direction in the Earth-based coordinate system based on the first vehicle-based direction.

51. The method of claim 50, wherein the first vehicle-based direction corresponds to a "course-over-ground" movement direction of the vehicle in a first RCU (Right, Course-over-ground, Up)-based coordinate system.

52. The method of claim 51, further comprising determining a second vehicle-based direction based on at least one of the first and second vehicle directions, the second vehicle-based direction corresponding to a "right" movement direction of the vehicle in the first RCU-based coordinate system.

53. The method of claim 52, further comprising transforming the second vehicle-based direction into a second Earth-based direction in the Earth-based coordinate system, wherein determining the spatial alignment of the IMU with respect to the Earth-based coordinate system is also based on the second Earth-based direction.

54. The method of claim 41, wherein the velocity data corresponds to movement of the vehicle in a first SPS-based coordinate system.

55. The method of claim 41, wherein the SPS- and IMU-derived accelerations are linear accelerations.

56. The method of claim 41, wherein the vehicle-related movement data further includes geodetic data obtained from one or more SPSs, the geodetic data corresponding to a position of the vehicle in a first geodetic coordinate system.

57. The method of claim 56, further comprising determining a first transformation matrix based on the geodetic data, the first transformation matrix being usable to convert between an RCU-based coordinate system and an Earth-based coordinate system.

58. The method of claim 57, further comprising determining a second transformation matrix based on the vehicle-related movement data, the second transformation matrix being usable to convert between an IMU-based coordinate system and an RCU-based coordinate system.

59. The method of claim 41, wherein the IMU is detachably secured either directly or indirectly to the vehicle during the measurements by the such that a position and an alignment of the IMU is constant relative to the vehicle during the measurements by the IMU.

60. The method of claim 41, wherein one or both of the first IMU-derived acceleration and the second IMU-derived acceleration are derived using an eigenvector.

* * * * *